(12) United States Patent
Dalby et al.

(10) Patent No.: US 6,184,831 B1
(45) Date of Patent: Feb. 6, 2001

(54) METHOD AND SYSTEM FOR DETERMINING LOCATION AND VELOCITY OF ELECTROMAGNETIC EMITTERS USING DOPPLER FREQUENCY MEASUREMENTS

(75) Inventors: Thomas G. Dalby; Albert W. Kratzke, both of Bellevue, WA (US)

(73) Assignee: The Boeing Company, Seattle, WA (US)

(*) Notice: Under 35 U.S.C. 154(b), the term of this patent shall be extended for 0 days.

(21) Appl. No.: 07/279,404

(22) Filed: Dec. 2, 1988

(51) Int. Cl.[7] .................................................. G01S 3/02
(52) U.S. Cl. .......................... 342/465; 342/107; 342/418
(58) Field of Search ..................................... 342/107, 465, 342/418; 364/458

(56) References Cited

U.S. PATENT DOCUMENTS

| | | |
|---|---|---|
| 2,837,738 | 6/1958 | Van Valkenburgh . |
| 3,171,126 | 2/1965 | Wiley . |
| 3,210,762 | 10/1965 | Brabant . |
| 3,254,341 | 5/1966 | Broussaud . |
| 4,060,809 | 11/1977 | Baghdady . |
| 4,203,115 | 5/1980 | Hannigan . |
| 4,553,144 | 11/1985 | Houdard et al. . |
| 4,647,874 | 3/1987 | Rittenbach . |

*Primary Examiner*—Theodore M. Blum
(74) *Attorney, Agent, or Firm*—John C. Hammar

(57) ABSTRACT

A method and system for calculating the range between a source which emits electromagnetic energy having an unknown frequency and a first receiver of electromagnetic energy at at least three points along a portion of a source trajectory. The source trajectory portion is a substantially straight line which has two end points. The first receiver moves along a first, substantially straight-line receiver trajectory so that the frequency of the electromagnetic energy is Doppler-shifted. The first receiver measures the Doppler-shifted frequency at at least three predetermined times. Next, at least two ratios of frequencies are calculated, the ratios being functions of the Doppler-shifted frequencies and bearing angles. Finally, the range between the first receiver and the source is calculated from the frequency ratios at the at-least-three points. In a first preferred embodiment the source is stationary.

47 Claims, 13 Drawing Sheets

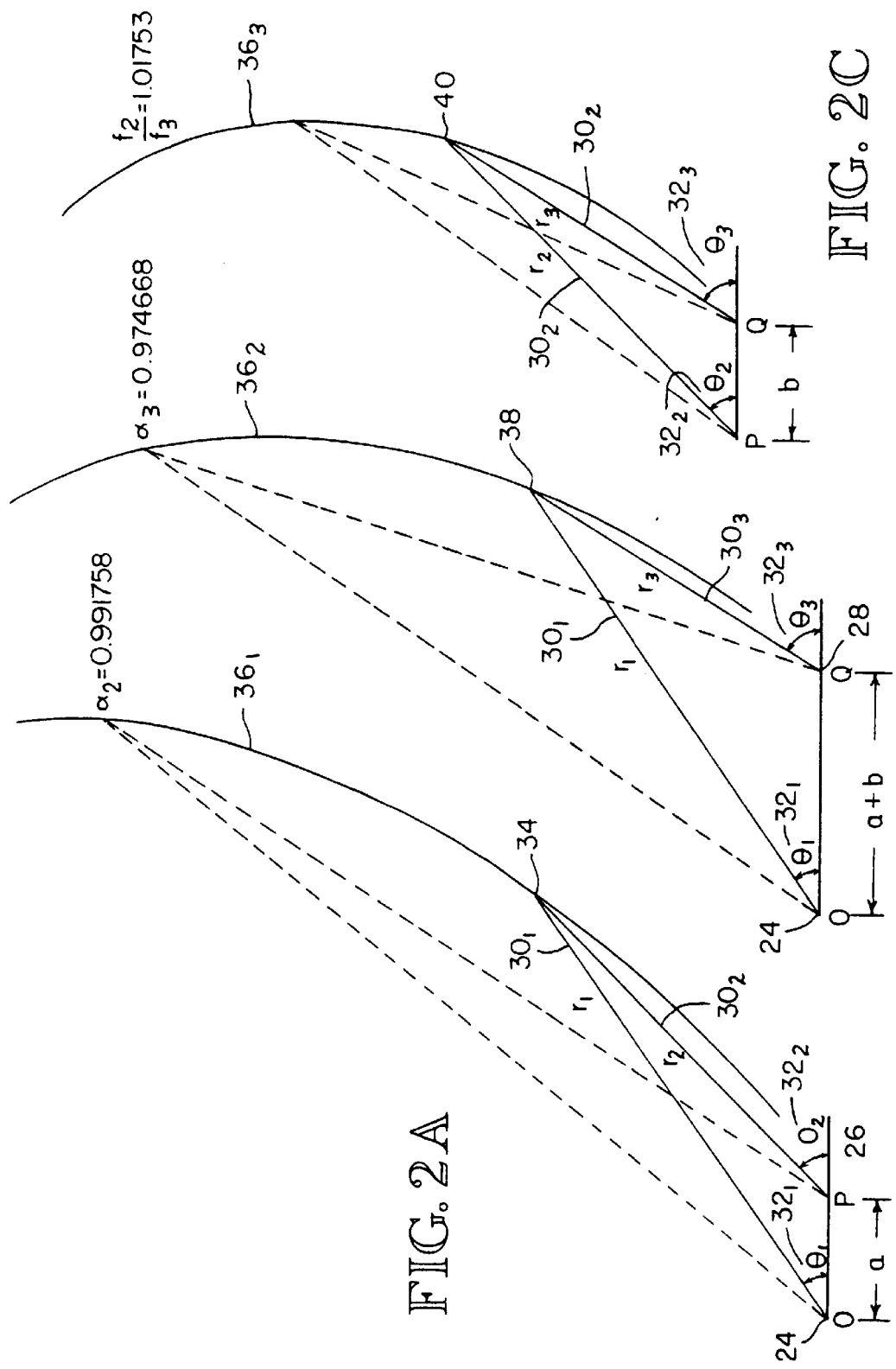

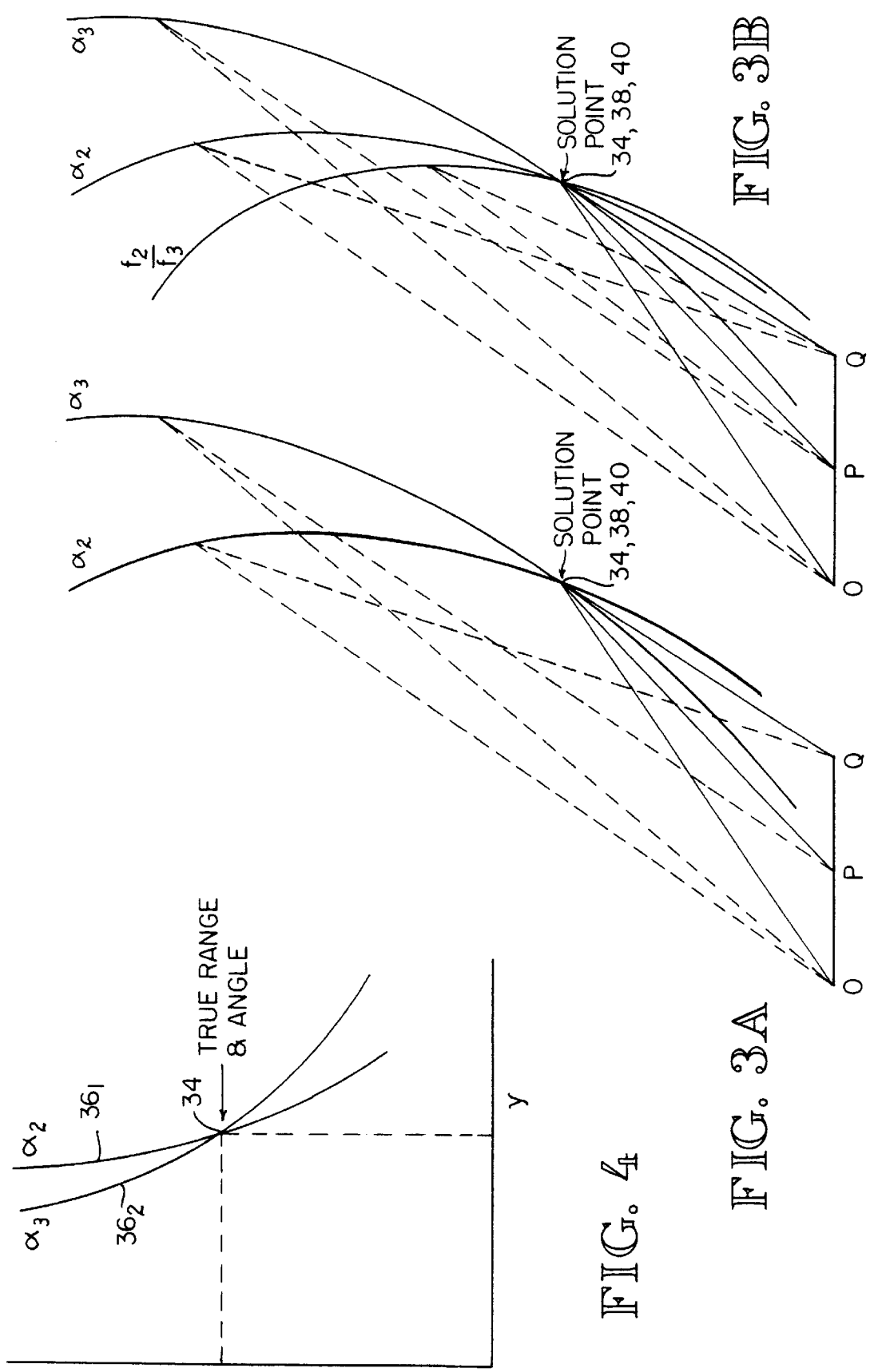

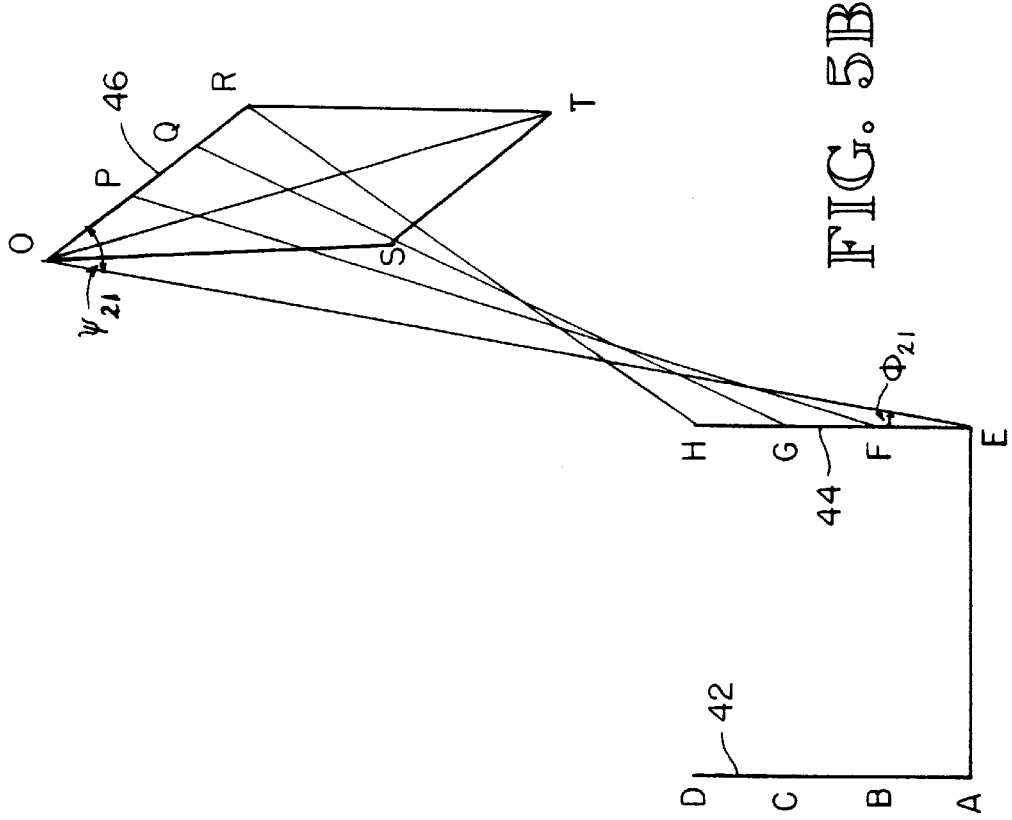
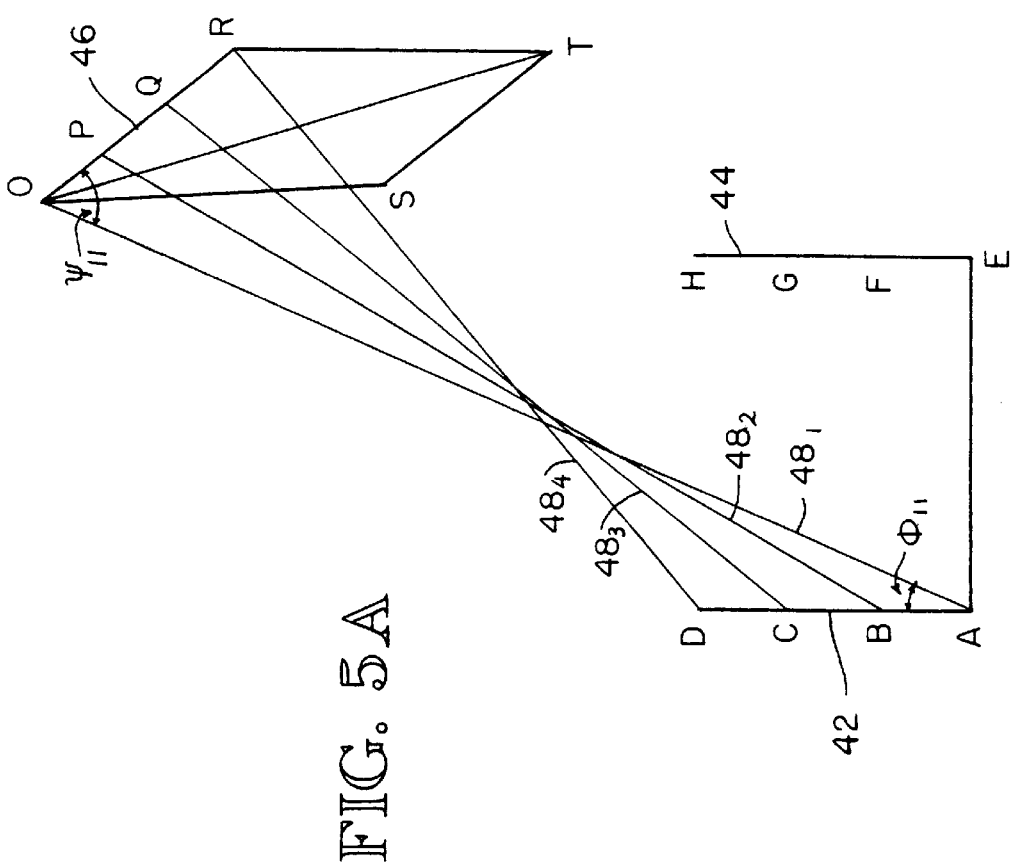

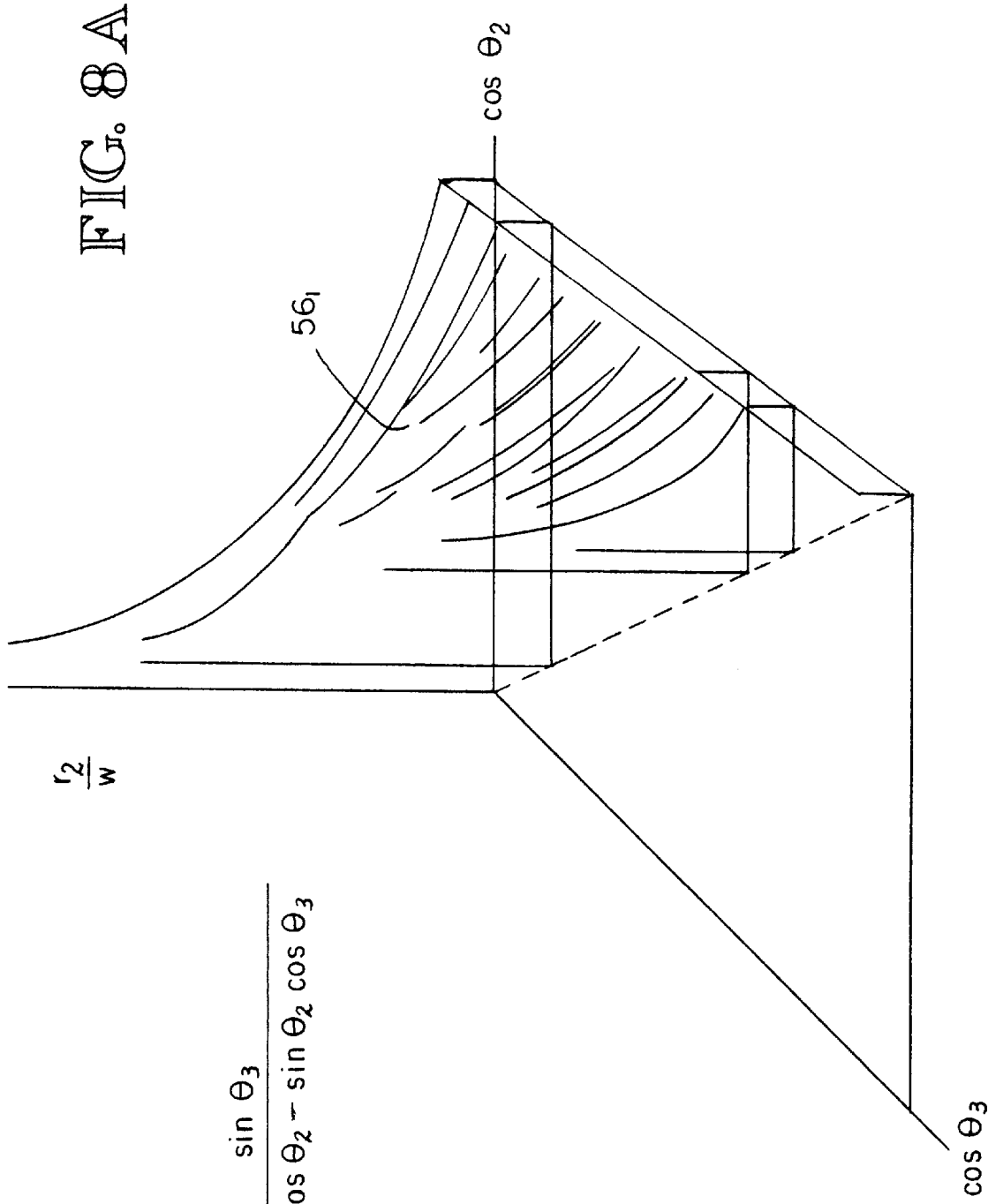

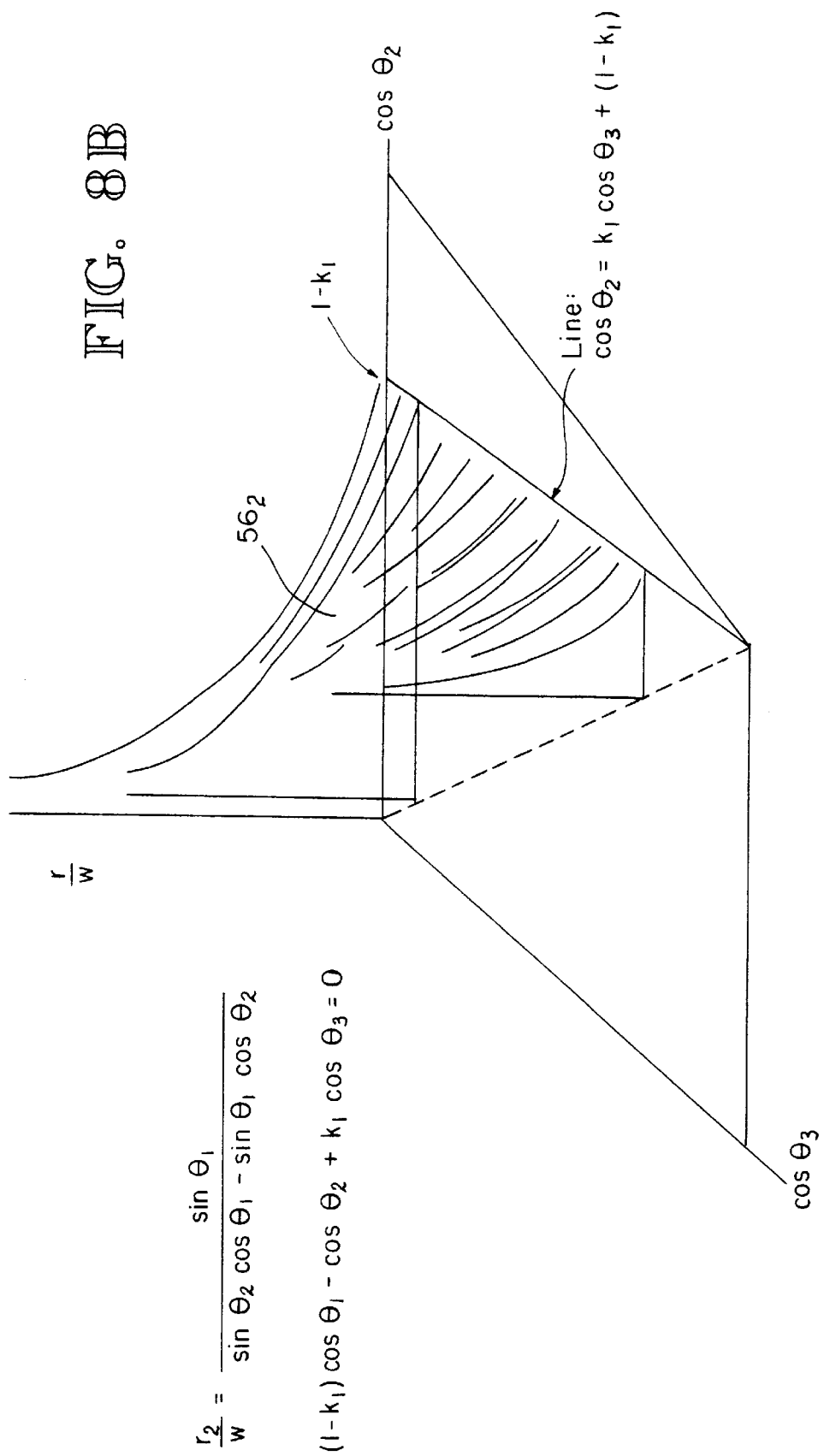

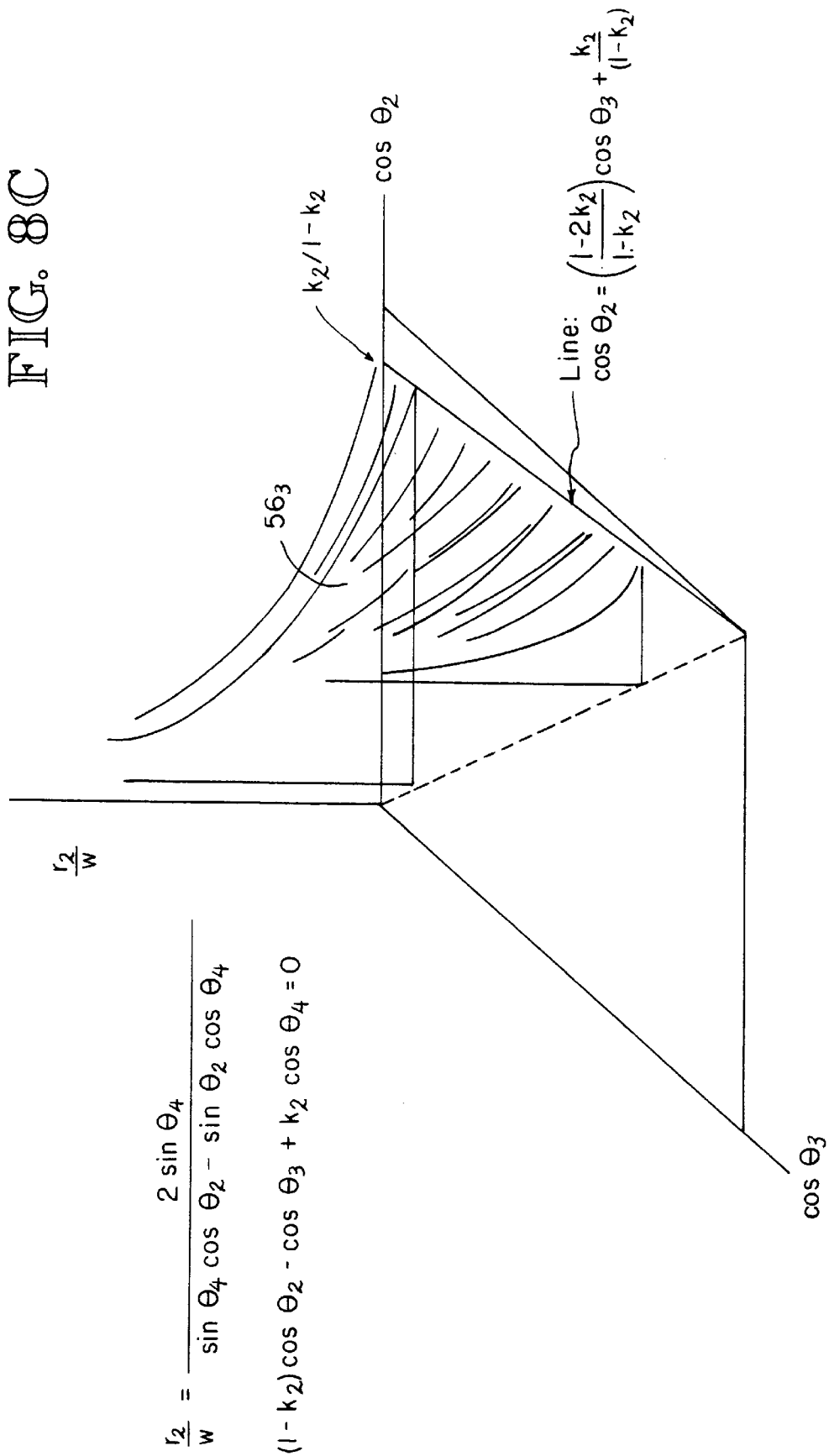

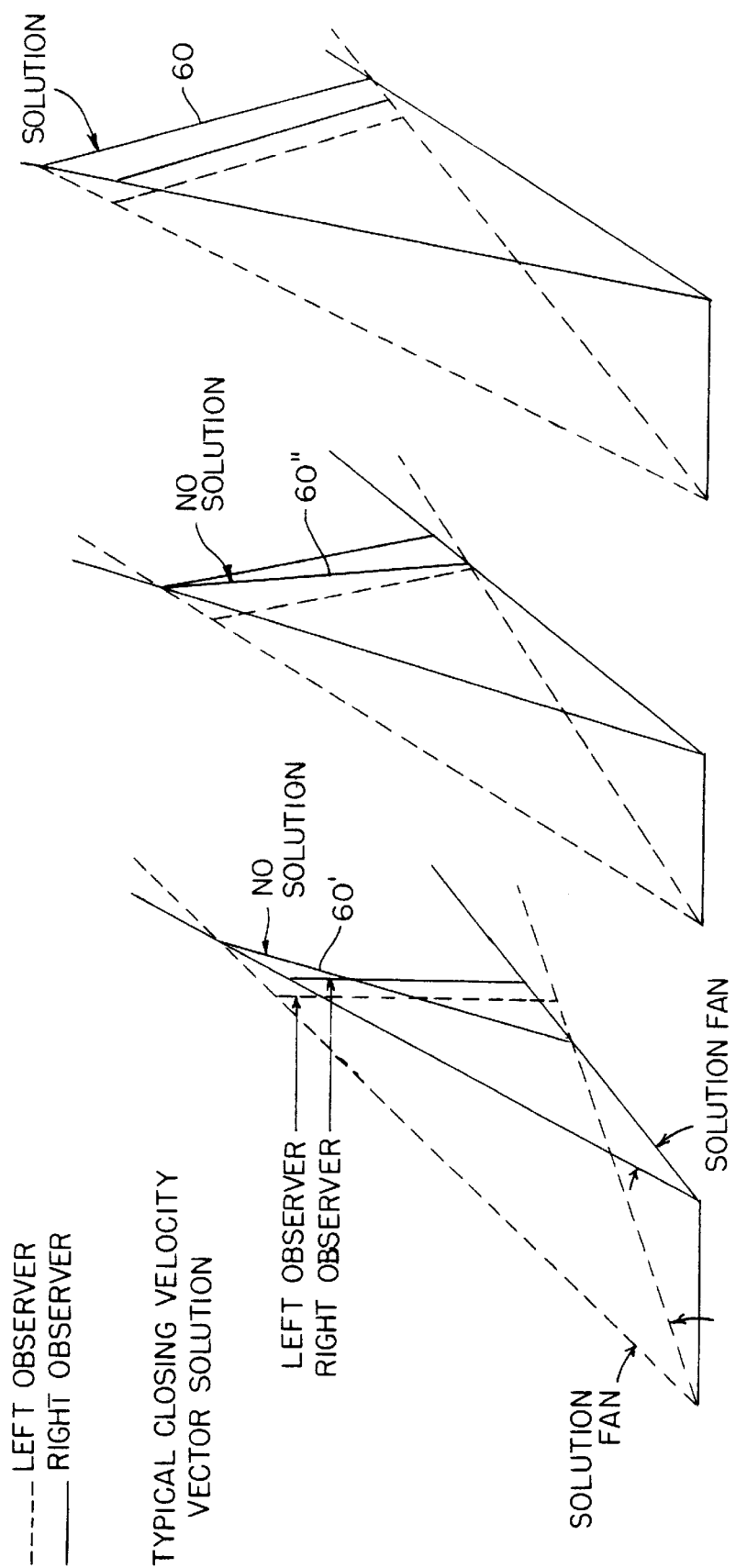

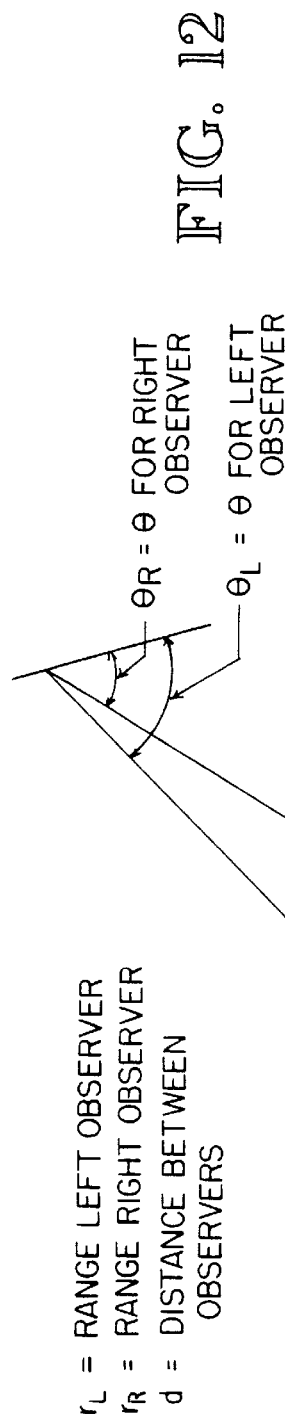
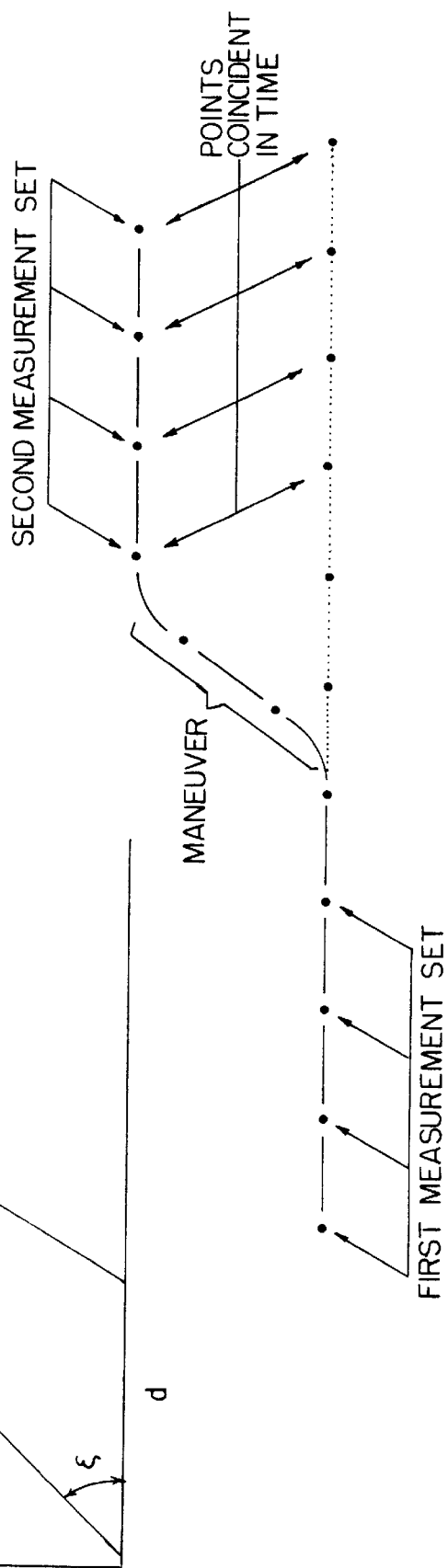
FIG. 12
FIG. 13
$r_L$ = RANGE LEFT OBSERVER
$r_R$ = RANGE RIGHT OBSERVER
$d$ = DISTANCE BETWEEN OBSERVERS

* IN THIS EXAMPLE, THE SEVENTH MEASUREMENT TIME

METHOD AND SYSTEM FOR DETERMINING LOCATION AND VELOCITY OF ELECTROMAGNETIC EMITTERS USING DOPPLER FREQUENCY MEASUREMENTS

TECHNICAL FIELD

The invention relates to a method and a system for determining the location and velocity of a source of electromagnetic signals by a receiver of those electromagnetic signals. More particularly, the invention relates to a method and a system for determining the location and velocity of a source of electromagnetic signals by a receiver of those electromagnetic signals, based on measurements of Doppler-shifted frequencies.

BACKGROUND ART

Combat aircraft are provided with means for detecting and locating noncooperative electromagnetic emitters, e.g., radars and communication transmitters, such means being known as "threat warning and location systems." Presently existing threat warning and location systems utilize directive receiving antennas to provide for determining the approximate location of such emitters. In order to provide the required directivity over a wide band of frequencies, multiple antennas, each of five to ten wavelengths in dimension, are required. The installation of such sets of antennas to provide appropriate viewing angles and to satisfy other requirements on combat aircraft of advanced design creates substantial problems for aircraft designers.

The present invention is directed toward determining emitter threat location and velocity through use of signal processing rather than antenna directivity. Depending on the desired sector coverage, no more than four small-aperture antennas are required for emitter detection and location system operation. The required aperture of each of such antennas would be no more than a few inches. Such small-aperture antennas pose minimal problems in installation and can readily be made consistent with other requirements on combat aircraft of advanced design.

It has been shown that a series of measurements of the Doppler-shifted frequency of the signals from any emitter, including noncooperative emitters, when made from a moving receiver such as one installed on an aircraft, can provide a basis for calculating location and velocity of the emitter. In order to make the necessary frequency measurements with sufficient accuracy, the emitter should produce coherent signals. In particular, signals which are not continuous (e.g., pulsed radar) should be coherent on a pulse-to-pulse basis. Other methods, such as estimation of unshifted frequency, measurement of time-difference-of-arrival, or part-time use of directive antennas, must be used when the signals are not coherent.

The familiar equation for Doppler shift is:

$$f_{D_i} = f_o\left(1 + \frac{v}{c}\cos\theta_i\right)$$

where $f_{D_i}$ is the value of the $i_{th}$ measurement of the Doppler-shifted frequency, $f_D$ $f_o$ is the unshifted frequency of the emitter V is the speed of the moving receiver c is the velocity of light $\theta_i$ is the angle between the velocity vector of the moving receiver and the direction of arrival of the signal from the source for $i_{th}$ measurement It might at first seem that a series of measurements of $f_D$ (expressed as $f_{D_i}$) coupled with velocity and position data would allow for solution of this equation in terms of θ (thus giving not only bearing but also, through additional calculations, being relational to the range to the emitter). Such, however, is not the case. The difficulty arises because the receiver lacks information concerning $f_o$. The procedure outlined above leads to a consistently undetermined set of linear equations in terms of a conventional solution. The difficulty could be resolved by recording maximum and minimum values of $f_D$ while the receiver executes a 360° turn. However, such a method is considered to be totally unacceptable from an operational standpoint.

It is therefore desirable to provide a method for determining the range between a receiver and an emitter of electromagnetic energy of unknown frequency.

DISCLOSURE OF THE INVENTION

It is an object of the present invention to provide a method for determining position and velocity of a threat emitter having an unknown signal frequency. Measurements of apparent (Doppler-shifted) frequencies are used.

It is another object of the present invention to provide a method for determining the position and velocity of an emitter through use of signal processing.

It is a further object of the present invention to provide a method for determining the position of a stationary emitter using frequency measurements recorded by a single moving observer.

It is a still further object of the present invention to provide a method for determing the position and velocity of a moving emitter using frequency measurements recorded by two moving observers.

It is yet another object of the present invention to provide a method for determining the position and velocity of a moving emitter using frequency measurements recorded by one moving observer.

It is a further object of the present invention to provide a system for determing the position and velocity of a threat emitter having an unknown signal frequency. Measurements of apparent (Doppler-shifted) frequencies are used.

It is another object of the present invention to provide a system for determining the position and velocity of an emitter using signal processing.

It is a further object of the present invention to provide a system for determining the position of a stationary emitter using frequency measurements recorded by a single moving observer.

It is a still further object of the present invention is to provide a system for determining the position and velocity of a moving emitter using frequency measurements recorded by two moving observers.

It is yet another object of the present invention to provide a system for determining the position and velocity of a moving emitter using frequency measurements recorded by one moving observer.

According to one aspect, the invention is a method for determining the range to a source which emits electromagnetic energy having a substantially constant but unknown frequency. The range is determined from measurements made at at-least-three points along a trajectory having a substantially straight-line portion. the method comprises four steps. The first step is (A) moving a first receiver along the trajectory. The first receiver is responsive to a spectral band that includes a frequency that is Doppler-shifted by relative motion between the source and the first receiver. The second step is (B) measuring the Doppler-shifted frequency of the received electromagnetic energy when the receiver is located at each of the three points on the trajectory. The third step is (C) calculating at least two ratios of frequencies. The frequencies are functions of the Doppler-shifted frequencies. The fourth step is (D) calculating the range between the first receiver and the source from the frequency ratios at the at-least-three points.

In a first preferred embodiment, the invention is a method for determining the position of a stationary source which emits an electromagnetic signal having a substantially constant but unknown frequency. The method comprises four steps. The first step is (A) that of moving an observer along a trajectory. The observer's signal receiver is responsive to a spectral band that includes frequencies that are Doppler-shifted by relative motion between the emitting source and the observer. The second step is (B) measuring the Doppler-shifted frequency of the received electromagnetic signal when the observer's receiver is located at each of three points on the trajectory. Also included in step (B) is measuring the distance between observer positions at the first and second frequency measurements and measuring the distance between observer positions at the second and third frequency measurements. The third step is (C) calculating at least two distinct ratios of the apparent frequencies. One ratio cannot be the reciprocal of the other. Each ratio is a function of bearing angles, relative velocity, and the velocity of light, but not a function of the unshifted emitter frequency, $f_o$. The fourth step is (D) calculating the position of the emitting source relative to the observer using the two frequency ratios and the distances between the trajectory points where the measurements were recorded.

In a second preferred embodiment, the invention is a method for determining the position and velocity of a moving source relative to each of two moving observers. The source trajectory is a substantially straight line. The emitted electromagnetic signal has a substantially constant but unknown frequency. The method comprises the following steps: (A) moving two observers along parallel, substantially straight-line portions of their respective parallel trajectories, (B) the two observers making simultaneous measurements of apparent frequencies at at-least-four points along their respective trajectories, (C) for each observer, recording the distance between observer positions at the first and second observations, the second and third observations, and the third and fourth observations, (D) for each observer, calculating two ratios of apparent frequency differences, each ratio being a function of three bearing angles, (E) for each observer, calculating a candidate set of relative positions and velocities from the observer's ratios of frequency differences and distances between observations, and (F) resolving the ambiguities by using both observers' sets of candidate solutions.

In a third preferred embodiment, the invention is a method for determining the position and velocity of a moving source relative to a single moving observer. The source trajectory is a substantially straight line. The emitted electromagnetic signal has a substantially constant but unknown frequency. The method comprises the following steps: (A) moving a single observer along a substantially straight-line portion of the observer's trajectory, (B) the observer recording frequency measurements at at-least-four points on the observer's trajectory, (C) the observer recording inter-observation distances, (D) the observer executing a maneuver to a trajectory parallel to the observer's original trajectory and at a distance from the original trajectory sufficient for resolution of ambiguities, (E) the observer recording a second set of measurements at at-least-four points on the observer's second trajectory, such observation points having the same inter-observation distances as the first set of observations, (F) the observer recording the second set of inter-observation distances, (G) calculating the two ratios of apparent frequency differences from the first set of frequency measurements, each ratio being a function of three bearing angles and, similarly, calculating two ratios of apparent frequency differences from the second set of frequency measurements, each ratio being a function of three bearing angles, (H) for each set of measurements, calculating a candidate set of relative positions and velocities from the ratios of frequency differences and the inter-observation distances, and (I) resolving the ambiguities using both sets of candidate solutions.

According to another aspect, the invention is a system for determining the range to a source which emits electromagnetic energy having a substantially constant but unknown frequency. The range is determined from measurements made at at-least-three points along a trajectory having a substantially straight-line portion. The system comprises a first receiver, responsive to a spectral band including a frequency of the electromagnetic energy that is Doppler-shifted by relative motion between the source and the first receiver, and means for moving the first receiver along the trajectory. The system further comprises means for measuring the Doppler-shifted frequency of the received electromagnetic energy when the receiver is located at each of said three points on the first trajectory and means for calculating at least two ratios of frequencies, the frequencies being functions of the Doppler-shifted frequencies. Further, the system comprises means for calculating the range between the first receiver and the source from the frequency ratios at the at-least-three points.

BRIEF DESCRIPTION OF THE DRAWINGS

FIGS. 2A–B are schematic diagrams showing the simultaneous solution of ranges between emitter and receiver.

FIGS. 3A–B are schematic diagrams further showing the simultaneous solution of ranges between emitter and receiver.

FIG. 4 is a graph depicting a ranging solution when the emitter is stationary.

FIGS. 5A–B are schematic diagrams showing the passive ranging geometries between the emitter and two receivers.

FIGS. 8A–8C are schematic diagrams showing the three solution surfaces resulting from solution of the moving emitter ranging problem.

FIGS. 11A–11D are schematic diagrams showing an iteration to a ranging solution for a moving emitter problem.

FIG. 12 is a schematic diagram describing an algebraic range calculation of the solution to the moving emitter problem.

FIG. 13 is a schematic diagram of the geometry of a single receiver measurement of the range of a moving emitter.

BEST MODES FOR CARRYING OUT THE INVENTION

Introduction

Consider a moving observer (or observers) attempting to locate a distant source of coherent electromagnetic radiation. Such a radar threat detection and location system must be continuously open (in both time and frequency) to all signals. Conventional search methods require highly directive, large-aperture antennas, which are difficult to install and which create substantial problems in design of advanced combat aircraft.

The inventive method of locating radar sources depends only on frequency measurements made from a moving observer to find both range and bearing of a target emitter. The methods use signal processing that takes advantage of the Doppler effect (observer and/or target must be moving). Since only frequency measurements are required, several small antennas (with dimensions, typically, of a few inches) will suffice for the necessary measurements.

Although the method and system as described can operate with a single small-aperture antenna, such an installation will, if the antenna is directed straight ahead (or behind), result in an ambiguity in emitter location between the right and left sides. To resolve such an ambiguity, two antennas, mounted so that each favors one side of the aircraft, are required.

Three cases will be considered in the following:

i. stationary source and one moving observer, ii. moving source and two moving observers, iii. moving source and one moving observer.

In all cases, only straight-line trajectories are considered in the following, although those skilled in the art will appreciate that appropriate signal processing will accommodate other known trajectories.

Stationary Source—One Observer

Figure 1A:
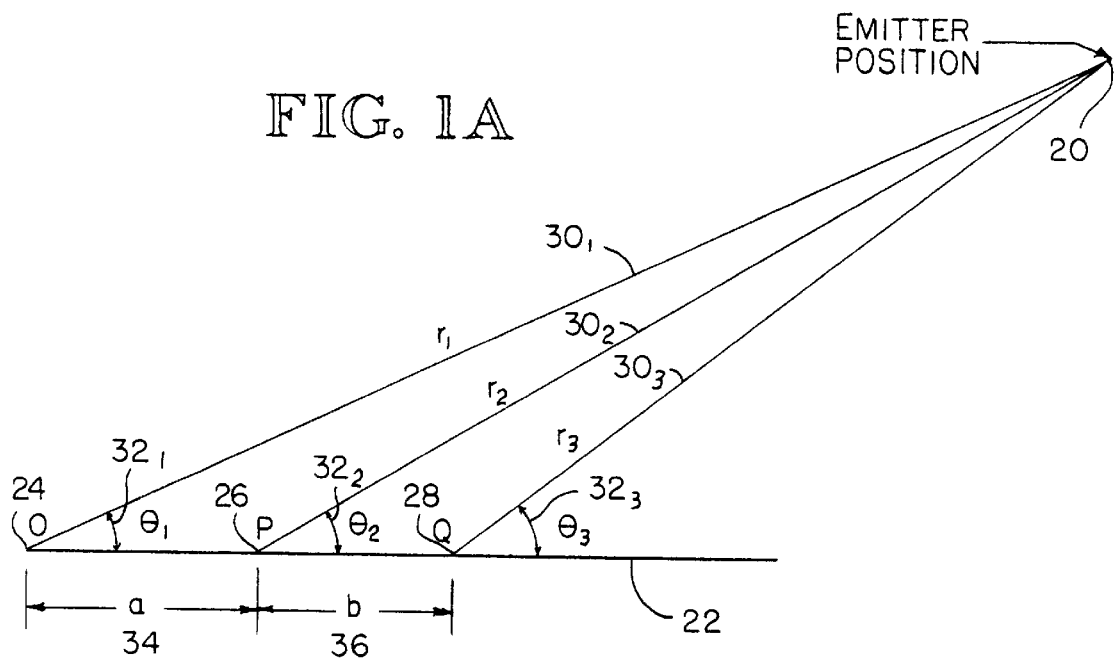
FIG. 1A is a schematic diagram of the geometric relationship between the emitter and the receiver.

For this case, the observer requires a minimum of three apparent (Doppler-shifted) frequency measurements taken at three points on the observer's trajectory. FIG. 1A illustrates the geometry. The emitter is at location 20, while the receiver moves along straight-line trajectory 22 (containing observation points 24, 26, and 28).

Note the following relations among the ranges ri (30i) and the angles θi (32i):

$$r_1 \cos\theta_1 = r_2 \cos\theta_2 + a = r_3 \cos\theta_3 + a + b$$

$$r_1 \sin\theta_1 = r_2 \sin\theta_2 = r_3 \sin\theta_3. \quad \text{1)}$$

From these, the ranges can be found in several different ways, each solution depending on a different pair of angles. The range $r_1$ can be expressed in two ways:

$$r_1 = \frac{a \sin\theta_2}{\sin(\theta_2 - \theta_1)} \quad \text{a)} \quad \text{2)}$$

-continued $$r_1 = \frac{(a+b)\sin\theta_3}{\sin(\theta_3 - \theta_1)} \quad \text{b)}$$

Let $f_o$ be the frequency of the emitter signal and c the velocity of light. The apparent frequencies of signals received at observation points 24, 26, and 28 along the observer's trajectory 22 are:

$$f_1 = f_o\left(1 + \frac{v}{c}\cos\theta_1\right) \text{ at } O \quad \text{a)} \quad \text{3)}$$

$$f_2 = f_o\left(1 + \frac{v}{c}\cos\theta_2\right) \text{ at } P \quad \text{b)}$$

$$f_3 = f_o\left(1 + \frac{v}{c}\cos\theta_3\right) \text{ at } Q \quad \text{c)}$$

The separations 34 and 36, between points 24 and 26 and points 26 and 28, respectively, are designated by dimensions a and b. Now let:

$$\alpha_2 = \frac{f_2}{f_1} = \frac{1 + \frac{v}{c}\cos\theta_2}{1 + \frac{v}{c}\cos\theta_1} \quad \text{a)} \quad \text{4)}$$

$$\alpha_3 = \frac{f_3}{f_1} = \frac{1 + \frac{v}{c}\cos\theta_3}{1 + \frac{v}{c}\cos\theta_1} \quad \text{b)}$$

$$\gamma = \frac{f_1}{f_0} = 1 + \frac{v}{c}\cos\theta_1 \quad \text{c)}$$

For any constant $\alpha_2$, an infinity of numerator-denominator combinations will satisfy 4-a) and therefore from 2-a) the range $r_1$ (30$_1$) can assume values along a curve (36) defined by 2-a) and 4-a). The same principle applies to 2-b) and 4-b). Finally, note that $\alpha_2/\alpha_3$ yields an expression in the angles $\theta_2$ and $\theta_3$ (32$_2$ and 32$_3$) and still a third relation involving $r_2$, $\theta_2$ and $\theta_3$ (30$_2$, 32$_2$, and 32$_3$) can be written as follows:

$$r_2 = \frac{b \sin\theta_3}{\sin(\theta_3 - \theta_2)} \quad \text{5)}$$

(This last expression is not needed by the location algorithm, but is included for the sake of completeness.)

Figure 1B:
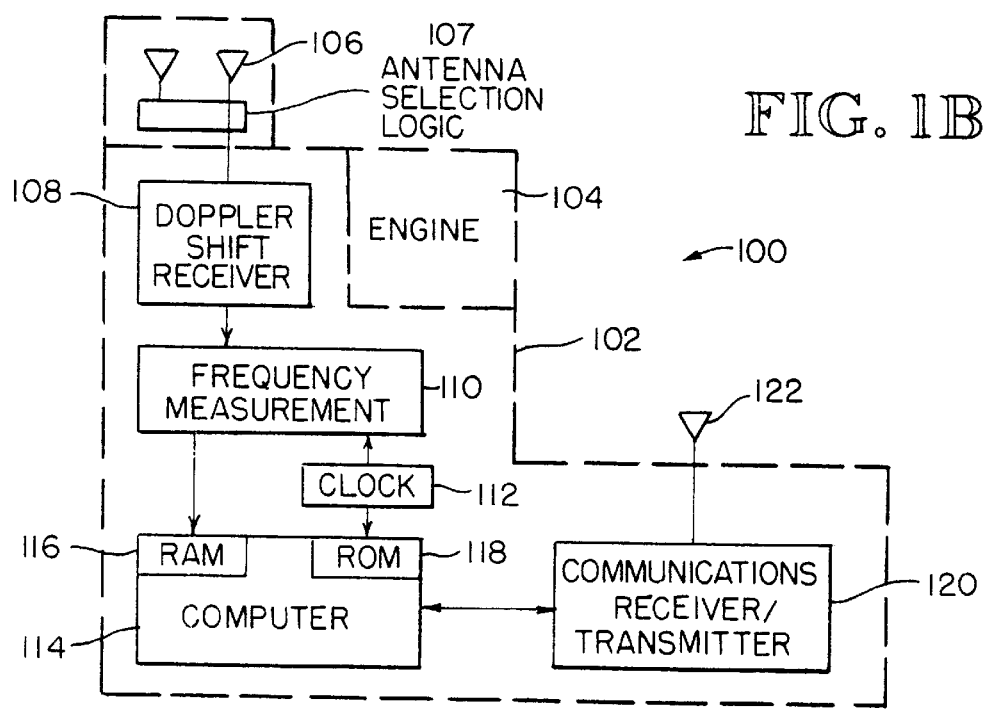
FIG. 1B is a schematic diagram of one embodiment of the receiver of the inventive system.

FIG. 1B is a schematic diagram of one embodiment of the receiver of the inventive system. The receiver 100 is located on a platform 102, such as an aircraft, spacecraft, ground vehicle, or marine vehicle. The platform can be moved controllably by a means of motive power, such as engine 104, which is attached to the platform 102. The platform 102 carries a receiving antenna system 106, consisting of one or more antennas, which is adapted to receive signals from the emitter 20 (see FIG. 1A). If more than one antenna is utilized, the system 106 also includes a logic device 107 to select the antenna from which the strongest signal is available. The logic device 107 then provides an indication as to the sector from which said strongest signal originates, thereby eliminating the previously mentioned left-right ambiguity. The antenna system 106 is connected to a Doppler-shift receiver 108. The Doppler-shift receiver 108 produces a signal representing a received frequency of the signal produced by the emitter 20 and passes this signal to a frequency measurement circuit 110.

The receiver 100 also includes a clock 112. The clock 112 produces clock signals that can be used by the frequency measurement circuit 110. The receiver 100 also includes a computer 114 which receives the frequency measurement signals produced by the frequency measurement circuit 110 and also receives clock signals from the clock 112. The computer 114 includes a data memory 116, such as a random-access memory (RAM), for storage of data and a program memory 118, such as a read-only memory (ROM). The program memory 118 contains the program which the processing unit (not shown) of the computer 114 executes to perform the desired calculations and other tasks to be described subsequently. The computer 114 can be programmed by conventional means to perform the desired calculations and other tasks.

The receiver 100 can also include a communications receiver/transmitter 120 which is connected to an antenna 122. The communications receiver/transmitter 120 is connected to the computer 114, which both controls the communications receiver/transmitter 120 and processes data which are received or are to be transmitted by the communications receiver/transmitter 120. Through antenna 122 (or some equivalent means), the communications receiver/transmitter 120 can communicate with other receivers 100 or with other stations capable of receiving and/or transmitting data compatibly with the communications receiver/transmitter 120.

In typical situations, the receiver 100 can receive and process Doppler-frequency data which it produces itself and, if applicable, can receive Doppler-frequency data produced by other receivers and transmitted to receiver 100 through the antenna 122 and the communications receiver/transmitter 120. By use of the clock 112, the receiver 100 can process frequencies measured simultaneously by one or more receivers 100 under the control of the computer 114.

The computer 114 can be operated, in accordance with its program, to calculate frequency ratios and ranges from the calculated frequency ratios, as will be described in greater detail below. The computer 114 is also capable of expressing the range between the source and the receiver in terms of such frequency ratios, and of equating and solving (possibly iterating) such expressions for frequency ratios, by methods well known to those skilled in the computing arts. This will include expressing ranges in terms of solution fans, which are functions of Doppler-shifted frequencies.

The geometry for some typical values of $\alpha_2$ and $\alpha_3$ is shown in FIGS. 2A–2C. In each of these figures, the range vectors ($30_1$, $30_2$, and $30_3$) that terminate on the curves 36, satisfy the particular range equation for the measured frequency ratio. For example, in FIG. 2A, the dotted range lines indicate a typical solution for $r_1$ ($30_1$) and $r_2$ ($30_2$). Any pair of range vectors that originates at points O and P (24 and 26) and terminates at the same point 34 in the curve $36_1$, is a solution pair, $r_1$ and $r_2$ for a constant $\alpha_2$. Similarly the range vector pair, $r_1$ and $r_3$ that originates at O and Q (24 and 28) and terminates at the same point 38 on the curve $36_2$, determined by $\alpha_3$, is a solution pair for $\alpha_3$. Thus, the only solution set ($r_1$, $r_2$, $r_3$) that satisfies both of the measurement constraints, $\alpha_2$ and $\alpha_3$ is the one for which all of the ranges terminate at the intersection of the solution curves $36_1$ and $36_2$ in the FIGS. 2A and 2B. This is illustrated in FIGS. 3A and 3B. FIG. 3A shows the unique solution point (34, 38, 40) for range and angle determination. (FIG. 3B is unnecessary, but it demonstrates that all correct range vectors meet at the intersection of the solution curves.)

To find the range and bearing analytically, substitute for $\theta_1$, $\theta_2$ and $\theta_3$ in 2-*a*) and 2-*b*) from 4-*a*), 4-*b*), and 4-*c*) and obtain range equations as functions of $\alpha_2$, $\alpha_3$ and Y. Thus, 2-*a*) and 2-*b*) become:

$$r_1 = \frac{a\left[1 - \left(\frac{c}{v}\right)^2(\alpha_2\gamma - 1)^2\right]^{1/2}}{(\gamma-1)\left(\frac{c}{v}\right)\left[1 - \left(\frac{c}{v}\right)^2(\alpha_2\gamma-1)^2\right]^{1/2} - (\alpha_2\gamma-1)\left(\frac{c}{v}\right)\left[1 - \left(\frac{c}{v}\right)^2(\gamma-1)^2\right]^{1/2}} \quad a)$$

$$r_1 = \frac{(a+b)\left[1 - \left(\frac{c}{v}\right)^2(\alpha_3\gamma - 1)^2\right]^{1/2}}{(\gamma-1)\left(\frac{c}{v}\right)\left[1 - \left(\frac{c}{v}\right)^2(\alpha_3\gamma-1)^2\right]^{1/2} - (\alpha_3\gamma-1)\left(\frac{c}{v}\right)\left[1 - \left(\frac{c}{v}\right)^2(\gamma-1)^2\right]^{1/2}}. \quad b)$$

6)

Each of these expressions for the range $r_1$ represents a curve 36 ($r_1$ v. $\gamma$) and the intersection 34 of the two curves $36_1$ and $36_2$ determines the common solution (see FIG. 4) and therefore the only one that satisfies the constraints $\alpha_2$ and $\alpha_3$.

Analytically, the solution is found by equating 6-*a*) to 6-*b*) and solving for $\gamma$. That value of $\gamma$, say $\gamma'$ substituted back into 6-*a*) or 6-*b*), yields $r_1$. Having found $r_1$ and cos $\theta_3$ all other ranges and angles can be found by manipulating the several range equations. For example, cos $\theta_3$ may be found from:

$$a_3\gamma' = 1 + \frac{v}{c}\cos\theta_3$$

and then $r_3$ may be found from:

$$r_3 = \frac{(a+b)\sin\theta_1}{\sin(\theta_3 - \theta_1)}, \text{ etc.}$$

Moving Source—Two Observers

The second problem is akin to cooperative triangulation, i.e., there are two observers (e.g., receivers 100 as shown in FIG. 1B) and their data must be used together to find the radiation source. Either observer alone can find a relative solution and taken together the two relative solutions yield an unique absolute solution. In this problem, there are two unknowns in the frequency-angle relation, viz. $f_o$ and the velocity of the unknown radiation source. For that reason, four measurements are required. Again, frequency ratios are used and they are the principal key to the solution method. The ratios shown below eliminate $f_o$ and source velocity by cancellation.

FIGS. 5A and 5B illustrate the method used to treat the case of observers moving in parallel straight-line trajectories and at the same (constant) velocity. The observing airplanes fly the straight-line trajectories AD and EH (42 and 44) while the emitting source flies the course OR (46) at a constant velocity.

The observers record frequency measurements simultaneously at times 0, $t_1$, $t_1+t_2$, and $t_1+t_2+t_3$. Their respective positions at those times are (A, E), (B, F), (C, G), and (D, H) and the source is at O, P, Q, and R. Here $f_1$, $f_2$, $f_3$ and $f_4$ are the frequencies, $f_i$, recorded at the four positions indicated above and the angles correspond to the frequencies in an obvious way. Let the observers' velocity be v and the source velocity u (with corresponding speeds, v and u). Then $AB=EF=vt_1$, $BC=FG=vt_2$, $CD=GH=vt_3$ and $OP=ut_1$, $PQ=ut_2$ and $QR=ut_3$. The lines of sight for each of the times (or positions) are shown for the left observer in FIG. 5A and for the right observer in FIG. 5B. The apparent frequencies (Doppler-shifted) sensed by the observers depend on closing velocities. Thus, at position A the left observer senses the frequency $$f_{11} = f_0 \left(1 + \frac{v \cos \phi_{11} + u \cos \psi_{11}}{c}\right)$$

where $\phi 11$ and $\psi 11$ are the angles between the "line of sight" 48 1 and the velocity vectors v (46) and u (48$_1$) respectively. The relationship between frequency and angle is given, as before, by $f_i = f_o(1 + v/c \cos \theta_o)$ so the ratio of frequency differences is $(f_1-f_2)/(f_1-f_3) = k_1 = (\cos \theta_1 - \cos \theta_2)/(\cos \theta_1 - \cos \theta_3)$. Similar expressions obtain for other frequency ratios. In particular, $(f_2-f_3)/(f_2-f_4) = k_2$, etc. The constants, $k_1$ and $k_2$ relate angles to each other and the dependence on $f_o$ and the source velocity has disappeared.

Figure 6B:
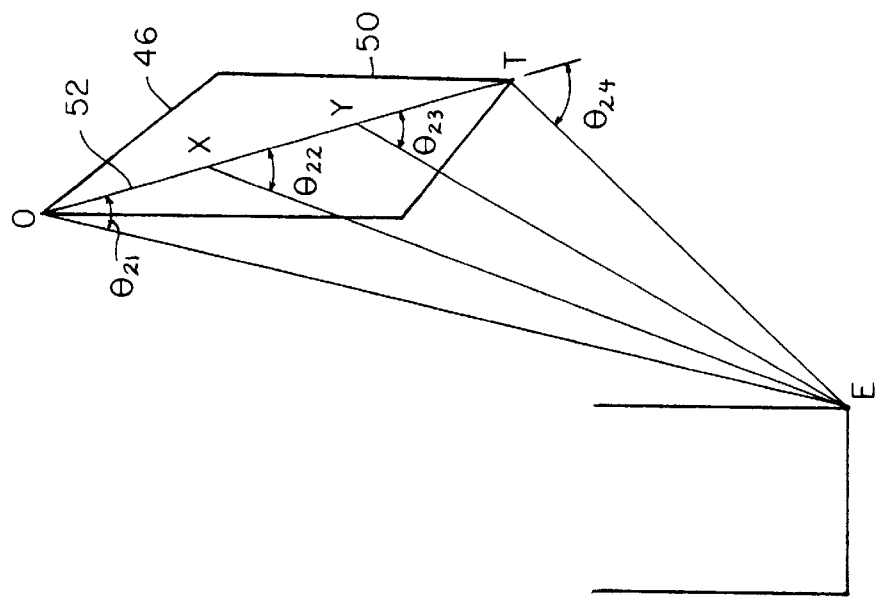
FIGS. 6A–B are schematic diagrams showing the relative geometries between the emitter and two receivers.
Figure 6A:
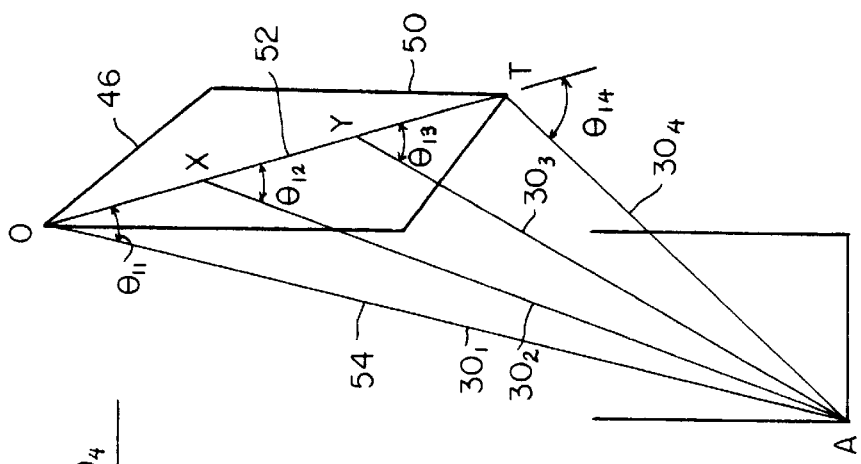
Figure 7:
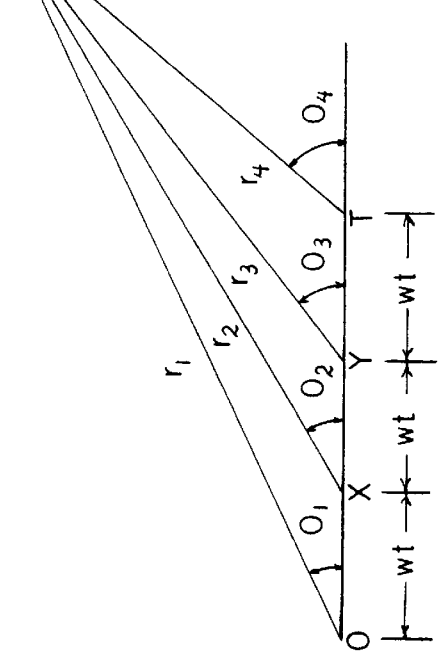
FIG. 7 is a schematic diagram showing the relative geometry between a receiver and a moving emitter.

Refer now to FIGS. 6A–B and 7 and note that the frequency can be written as:

$$f_{11} = f_0 \left(1 + \frac{\omega \cos \theta_{11}}{c}\right)$$

where w (OT) 52 is the vector sum of v (46) and u (50) and $\theta_{11}$ is the angle between the line of sight 54 and w. All other frequencies are derived in the same way.

In what follows, the subscript that identifies the right and left observers is dropped and only one subscript is used. The subscript identifies position or time. Thus, apparent frequencies at times 1, $t_1$, $t_1+t_2$, and $t_1+t_3$ are taken to be $f_1$, $f_2$, $f_3$, and $f_4$.

Consider now the relative observation geometry for either observer.

Each of the ranges $30_1$–$30_4$ can be expressed in several ways, e.g.:

$$r_2 = \frac{\omega t \sin \theta_3}{\sin \theta_3 \cos \theta_2 - \sin \theta_2 \cos \theta_3} \quad \text{a)} \quad 7)$$

$$r_2 = \frac{\omega t \sin \theta_1}{\sin \theta_2 \cos \theta_1 - \sin \theta_1 \cos \theta_2} \quad \text{b)}$$

$$r_2 = \frac{\omega t \sin \theta_4}{\sin \theta_4 \cos \theta_2 - \sin \theta_2 \cos \theta_4} \quad \text{c)}$$

(Any of the other ranges could have been chosen to work with, but note that if one of the ranges and the angles can be found, the other ranges can then also be derived.)

In order to find the ranges, ratios are formed, much the same as for the stationary source. Let the frequencies measured at O, X, Y, and T be $f_1$, $f_2$, $f_3$, and $f_4$, respectively, and calculate the ratios:

$$\frac{f_1 - f_2}{f_1 - f_3} = k_1 = \frac{\cos \theta_1 - \cos \theta_2}{\cos \theta_1 - \cos \theta_3} \quad 8)$$

$$\frac{f_2 - f_3}{f_2 - f_4} = k_2 = \frac{\cos \theta_2 - \cos \theta_3}{\cos \theta_2 - \cos \theta_4}$$

These equations can be rearranged to give:

$$(1-k_1) \cos \theta_1 - \cos \theta_2 + k_1 \cos \theta_3 = 0 \quad 9)$$

$$(1-k_2) \cos \theta_2 - \cos \theta_3 + k_2 \cos \theta_4 = 0$$

Now each of the three equations for $r_{2/w}$ in 7) is written as a function of $\cos \theta_2$ and $\cos \theta_3$. In the second equation in 7), substitute for $\theta_1$ from the first equation in 9). The result is a function of $\cos \theta_2$, $\cos \theta_3$ and $k_1$. In the third equation of 7), substitute for $\theta_4$ from the second equation in 9). The result is a function of $\cos \theta_2$, $\cos \theta_3$ and $k_2$. Since $k_1$ and $k_2$ are measured quantities, there are three expressions for $r_{2/w}$ as a function of the two variables $\cos \theta_2$ and $\cos \theta_3$.

Thus, the following relations result:

$$(r_{2/w})\text{I} = g_1 (\cos \theta_2, \cos \theta_3)$$

$$(r_{2/w})\text{II} = g_2 (\cos \theta_2, \cos \theta_3, k_1)$$

$$(r_{2/w})\text{III} = g_3 (\cos \theta_2, \cos \theta_3, k_2) \quad 10)$$

Each of these equations represents a surface 56 in the three-dimensional space defined by coordinates $r_{2/w}$, $\cos \theta_2$, $\cos \theta_3$. The unique intersection of the three surfaces 56 yields the only solution for $r_{2/w}$ common to the three surfaces.

A computer program, easily programmed in a conventional manner and contained in the program memory 118 (see FIG. 1B), can be used to find the intersection (solution) for any ($f_1$, $f_2$, $f_3$, $f_4$) input set. This procedure is done for each of the two observers, so that two solution sets are obtained. Since w is unknown, one solution set will not suffice for this purpose.

Thus, for each observer, there is a solution set which will be referred to as a solution "fan."

Figure 10:
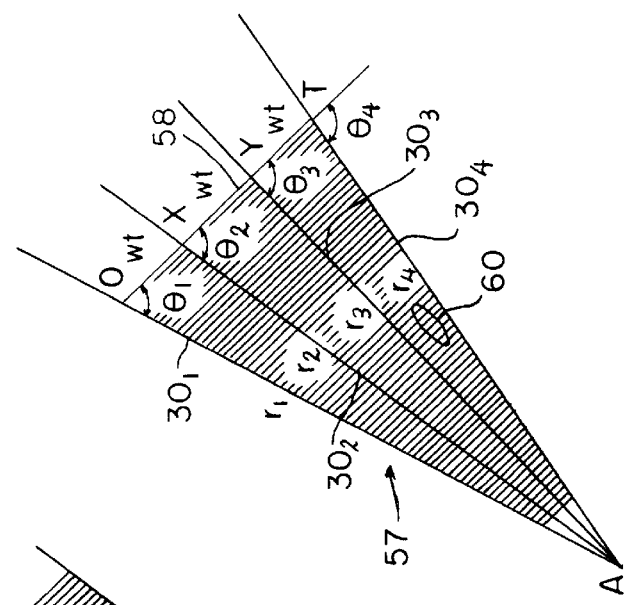
FIG. 10 is a schematic diagram showing details of a solution fan.
Figure 9B:
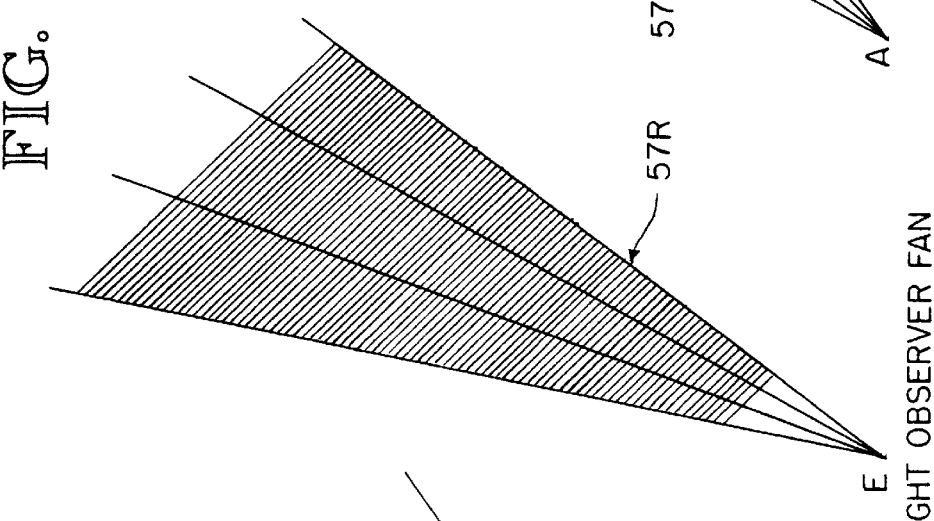
FIGS. 9A–B are schematic diagrams showing the solution fans corresponding to the sets of acceptable ranges determined by the left and right receivers, respectively.
Figure 9A:
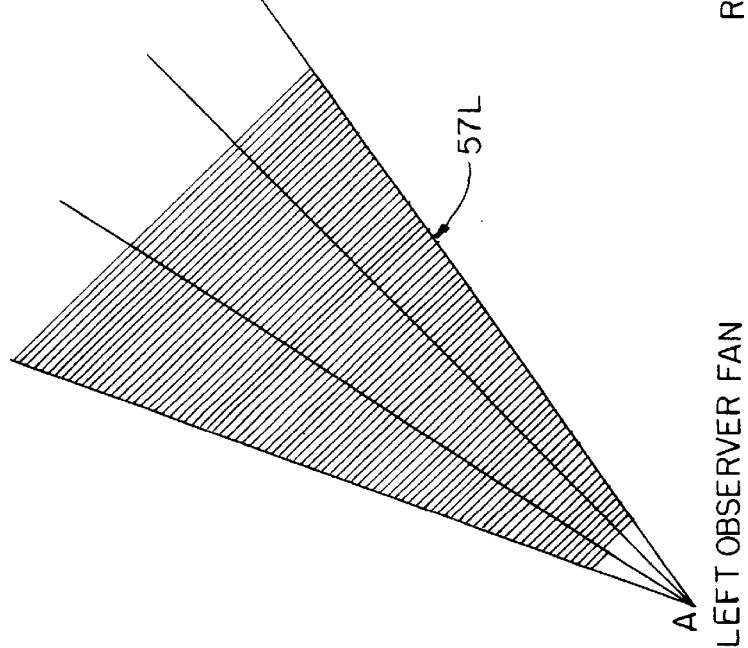
Figure 11D:
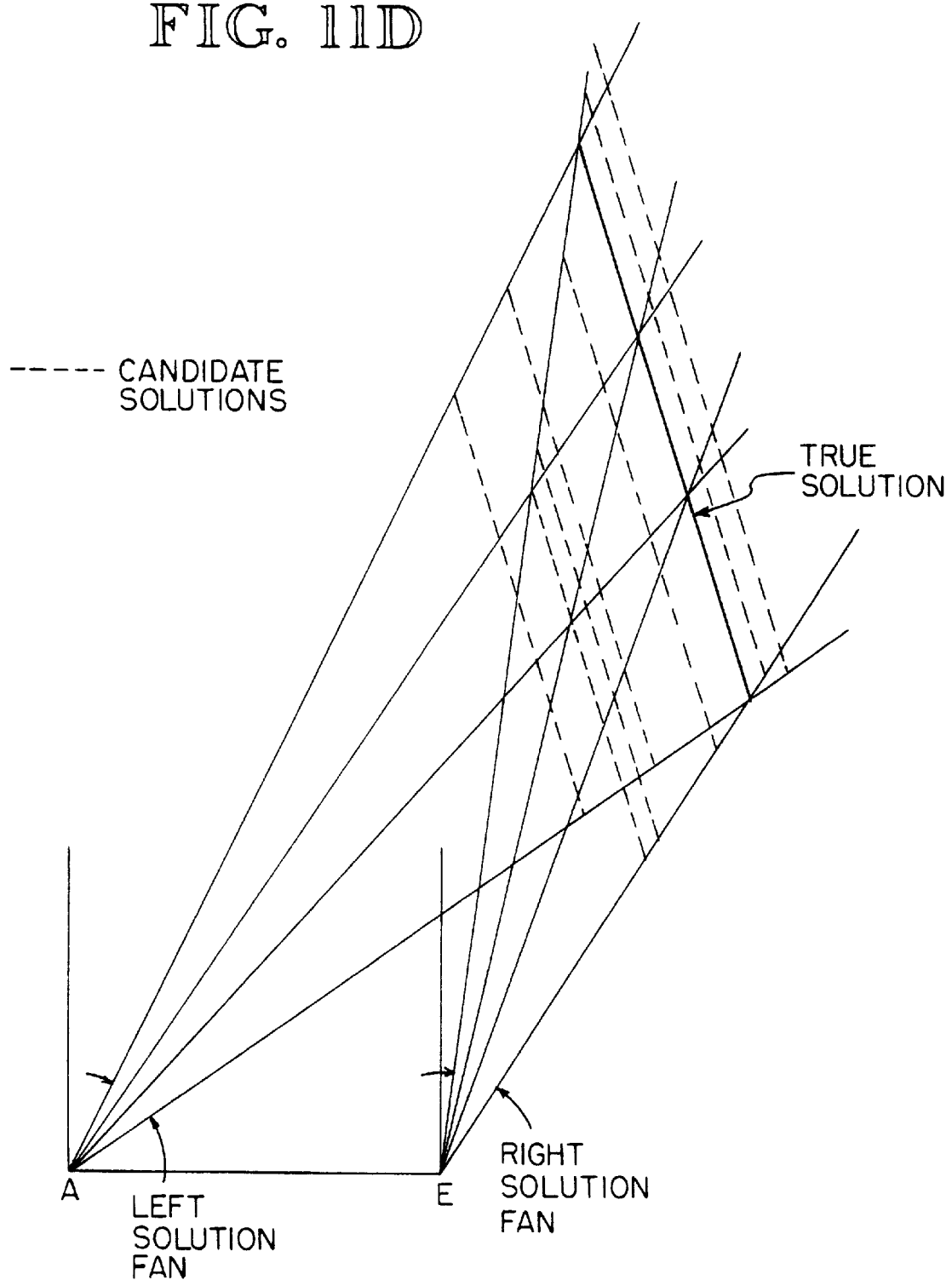

With reference to FIGS. 9A and 9B, the solution for each fan 57 yields the angles ($\theta_1$, $\theta_2$, $\theta_3$, $\theta_4$). The ranges ($r_1$, $r_2$, $r_3$, $r_4$) lie along the range lines 30 in FIG. 10, but the actual range is not known. The distance wt 58 lies on one of the parallel lines 60 and there is an infinite number of such solutions.

Furthermore, the solution fans 57L and 57R can respectively be rotated about A and E and assume any of an infinite number of angular positions. In order to get an absolute solution from the two relative solutions, the true closing velocity vectors must coincide, i.e., the vector for the left fan 57L must be the same as the one for the right fan 57R. Thus, the fans 57 are rotated so that the solution Vectors are parallel. The line 60' joining the intersection of the two $r_1$ lines (one for each fan 57) and the intersection of the two $r_4$ lines is one of the candidate solutions. This line, then is the true solution. Figures 11A–D illustrate how the two sets of relative solutions are resolved to find the (unique) true solution 60.

The method for finding the true solution as shown above, has intuitive appeal, but "fan matching" is probably expensive in terms of computer storage. Accordingly, an alternate (algebraic) method is available. Consider one of the ranges, say $r_2$. The subscript "2" is dropped and $r_L$=range ($r_1$) for left observer
$r_R$=range ($r_2$) for right observer
d=distance between observers
$\theta_L$=$\theta_1$ for left observer
$\theta_R$=$\theta_2$ for right observer Note that $r_{L/w}$, $r_{R/w}$, $\theta_L$, and $\theta_R$ are all known. (The intersection point of the three surfaces in FIGS. 8A–C and some algebraic manipulation yields these quantities.)

Let:

$$\theta_L - \theta_R = \theta$$

$$\frac{r_{L/w}}{r_{R/w}} = \frac{r_L}{r_R} = k \text{ or } r_L = kr_R$$

Then:

$$d^2 = R^2_R + k^2 r^2_R - 2kr_R^2 \cos\theta \text{ or}$$

$$r_R^2 = \frac{d}{[1 + k^2 - 2k\cos\theta]^{1/2}} \quad 11)$$

Having determined the angles, fan orientation, and ranges, all that remains is to resolve the closing velocity vector w 52 into its components, v 50 (observer velocity) and u 46 (source velocity).

Recalling the relative geometry for one of the observers, the parallelogram OSTR defines the several velocities. The angle, $\zeta$ is related to other (known) angles as follows:

$$\theta_1 - \zeta = \frac{\eta}{2} - \xi \quad 12)$$

and $\zeta$ can be found by referring to FIG. 6A, which can be used for algebraic calculation of range.

In FIG. 12, $\theta_R$ and $\theta_L$ are $\theta_1$ for right and left observer respectively, and similarly, $r_R$ and $r_L$ are $r_1$ for right and left observers. The range $r_R$ is known from 10) and the law of sines determines $\epsilon$.

$$\frac{d}{\sin(\theta_L - \theta_R)} = \frac{r_R}{\sin \xi} \quad 13)$$

Thus, from 12) and 13) $\zeta$ can be calculated. The source velocity u is the vector difference between the closing velocity and the observer velocity, w-v. The magnitude of source velocity, u is given by:

$$u^2 = w^2 + v^2 - 2wv\cos\zeta \quad 14)$$

Moving Source—One Observer

The one-observer problem is solved in exactly the same way as the two-observer problem; but, since all the data must be collected by one observer, some penalties must be expected. For the two-observer case, the data are collected along parallel trajectories, so one observer, such as receiver 100 (see FIG. 1), must execute a maneuver. Part of the data (the first four frequency measurements) is recorded on one substantially straight-line trajectory and the other part of the data (the second group of four frequency measurements) is recorded on a parallel, substantially straight-line trajectory. This method, of course, requires more time than the two-observer method. Refer to FIG. 13 for a geometrical description.

Recall that in the two-observer case, each observer was stipulated to make his measurements at exactly the same times as the other observer makes his. From FIG. 13, it is clear that such a measurement schedule is not possible. However, in what follows it will be shown how a "phantom" measurement set can be created with only the knowledge of the first measurement set. This process is called "fan iteration."

First, the solution fan using the first four frequency measurements is calculated. Assuming that the observer continues on the same straight-line trajectory at a constant velocity (dotted line in FIG. 13) the solution fans 57 that would result at each of the time points after the first can be derived from the first one.

Consider the first iteration. Recall how the "relative geometry" fan 57 is constructed. From FIGS. 5A–D and 6A–B note that the line-of-sight vectors $48_2$–$48_4$ (left observer) originating at B, C, and D (FIG. 5A) are all translated so that they originate at A (FIG. 6A). If a fan 57 which originates at B is constructed, those line-of-sight vectors $48_3$ and $48_4$ originating at C, D, and a fifth measurement point would be translated to B, etc.

Note that the second line-of-sight vector $48_2$ in the "A" fan is parallel to the first line-of-sight vector $48_2$ in the "B" fan and that the third vector in the "A" fan is parallel to the second vector in the "B" fan, etc. Thus, it is possible to construct a fan 57 originating at any point B, C, D, etc. (all equally spaced), without actually collecting data (frequency measurements) at those points along the dotted line in FIG. 13. Those solution fans are referred to as phantom or iterated fans. An iterated fan can be treated exactly as though it were a fan derived from real measurements. Measurements made along a constant velocity flight trajectory would indeed be exactly the same as those derived from the first group of four.

Figure 15:
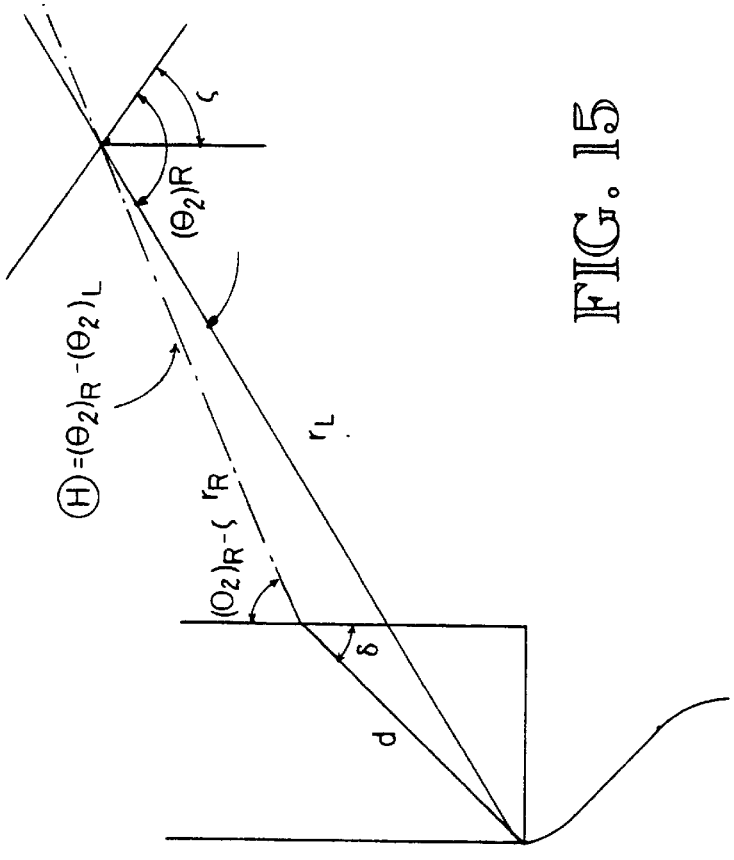
FIG. 15 is a schematic diagram of the geometry of the solution for range and angles for the moving emitter-receiver problem.
Figure 14:
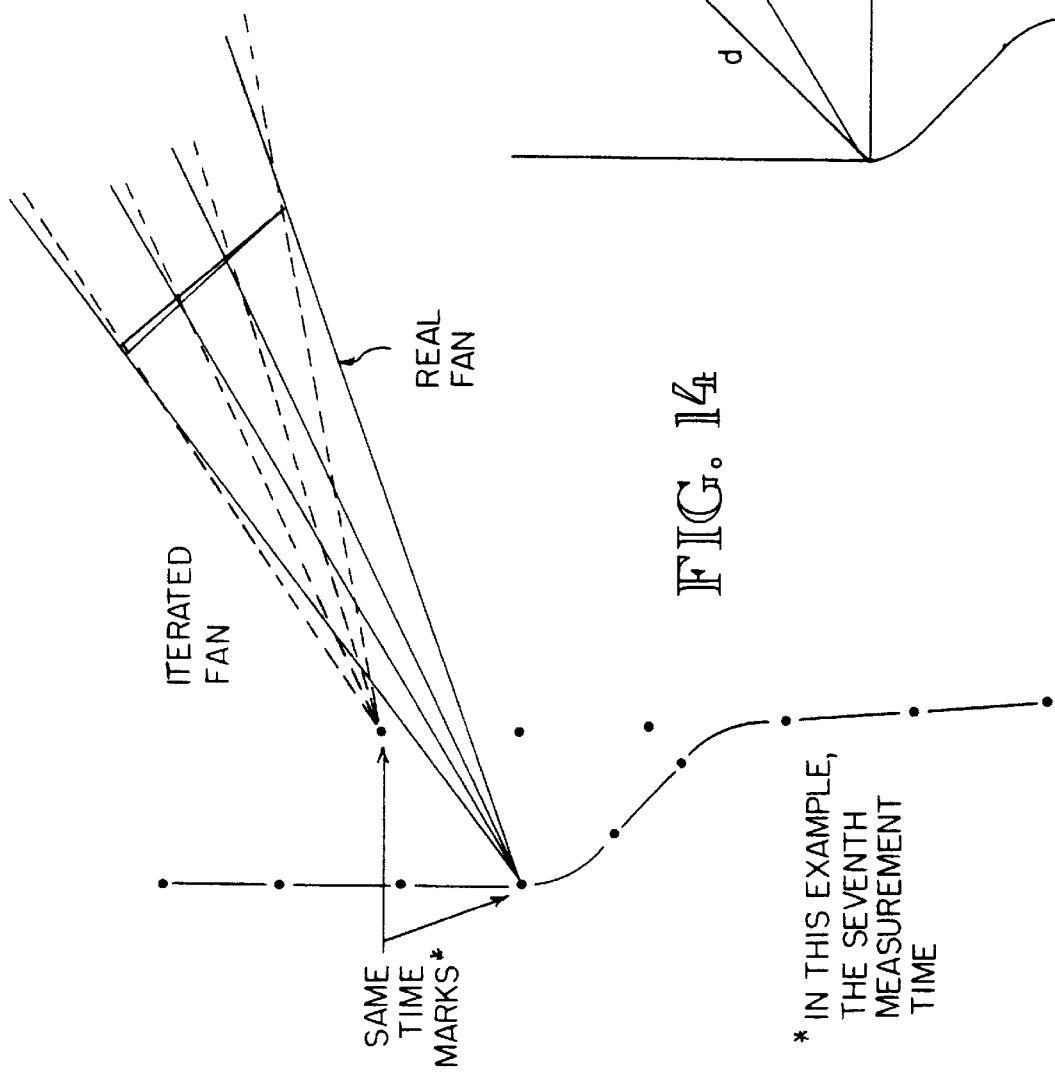
FIG. 14 is a schematic diagram of the iterated fan solution of the moving emitter-single receiver problem.

Now it is easy to apply the methods of the previous section. Another solution fan calculated from measurement points along a parallel trajectory (after the maneuver) is used with the iterated fan to complete the solution for absolute values of range, bearing and velocities. The calculation for the angles is a little more complicated than the similar calculation in the two-observer case. FIG. 15 shows a portion of FIG. 14 which has been enlarged and had pertinent lengths and angles added. Note that d, the distance between the observer and the other reference point ("phantom" observer) is known because the observer's maneuver is known. For the same reason, the angle $\delta$, is known. The distance $r_R$ and $r_L$ are calculated using 10). Then $\zeta$ can be found from:

$$\frac{d}{\sin\theta} = \frac{r_L}{\sin[\eta - \{(\theta_2)_R - \zeta\} + \delta]} = \frac{r_L}{\sin[(\theta_2)_R - \zeta - \delta]} \quad 15)$$

The accuracy of range and bearing determined by methods disclosed herein is dependent on measurement accuracies of the frequencies. Other factors also contribute, but the errors in apparent frequencies are the dominant contributors.

The error analysis conducted in conjunction with the developments described in this disclosure shows that the methods are feasible. For example, the bearing error for a stationary emitter at 30° initial bearing is approximately 6°. This compares favorably with errors incurred using conventional methods that require large antennas.

This method for deriving the position and velocity of an emitter of electromagnetic signals is based on two-dimensional geometry. For virtually all cases of practical interest, solutions in two dimensions suffice; extension of the method to three dimensions, while complex, is nonetheless straightforward.

While the preferred embodiments of the present invention have described in the foregoing, one skilled in the art will readily appreciate that various modifications of the invention may be made without departing from its spirit and scope. Accordingly, the spirit and the scope of the present invention are to be limited only by the following claims.

What is claimed is:

1. A method for determining the position and velocity of an emitter of an electromagnetic signal having a substantially constant but unknown frequency, the method comprising the steps of:

(A) moving a single receiver with a substantially constant velocity along a substantially straight-line trajectory, said receiver being responsive to all signals lying in the spectral band of frequencies that are Doppler-shifted by the motion of the receiver relative to the emitter and active at all times;

(B) receiving signals by said receiver;

(C) measuring a Doppler-shifted frequency of one of said received signals at each of at least three points along said receiver trajectory and measuring inter-measurement distances or time spans of said moving receiver between said at least two points, there being three possible pairs of frequency measurements;

(D) calculating two ratios of said three possible Doppler-shifted frequency pairs, each ratio being a function of a bearing angle between said receiver trajectory and a receiver-to-source line-of-sight at a place or time of said measurement of said first frequency of said ratio and said bearing angle at said place or time of said measurement of said second frequency of said ratio; and (E) calculating a position of said emitter relative to said moving receiver from said frequency ratios and inter-measurement distances or time spans.

2. The method of claim 1 wherein step (E) comprises the following steps:

(E1) expressing the distance between said emitter and said moving receiver at said first point or time as a function of the first of said two calculated ratios of frequencies, a function of said ratio of said first measured Doppler-shifted frequency and said unknown emitter frequency, and a function of a distance moved by the receiver between a first and a second frequency measurement;

(E2) expressing said distance between said emitter and said moving receiver at said first place or time as a function of a second of said two calculated ratios of frequencies, as a function of said ratio of said first measured Doppler-shifted frequency and said unknown emitter frequency, and as a function of a distance moved by the receiver between said first and a third frequency measurement;

(E3) equating the two expressions for said distance between said emitter and said moving receiver at said first measurement point and solving for said ratio of said first measured Doppler-shifted frequency and the unknown emitter frequency;

(E4) finding said distance between said emitter and the moving receiver at said first measurement point by substituting said ratio of said first measured Doppler-shifted frequency and said unknown emitter frequency into either expression for the distance expressed as in step (A) or step (B); and (E5) calculating the distance between said emitter and said receiver at said second measurement point and said distance between the emitter and the receiver at said third measurement point from the receiver-to-source range found in step (E4).

3. A method for determining the position and velocity of an emitter of an electromagnetic signal moving with a substantially constant but unknown velocity and having a substantially constant but unknown frequency, the method comprising the steps of:

(A) moving two receivers with substantially identical velocities along parallel, substantially straight-line trajectories, each said receiver being responsive to all signals lying in the spectral band of frequencies that are Doppler-shifted by the motion of the source in the receiver's frame of reference and active at all times;

(B) receiving signals by said receiver;

(C) for each receiver, measuring a Doppler-shifted frequency of one of said emitted signals received at each of four points along its trajectory, and measuring inter-measurement distances or time spans for each receiver's set of frequency measurements, both receivers having the same sum of inter-measurement distances or time spans;

(D) for each receiver, calculating two ratios of frequency differences, each ratio involving three frequencies for frequency measurements at four points on the receiver trajectory, there being four possible triples of frequency measurements, each ratio being a function of the bearing angle between the closing velocity vector and the receiver-to-source line-of-sight in the receiver frame of reference at each of the three measurement points or times in the three measurement triples used for the ratio of frequency differences;

(E) for each receiver, calculating a candidate set of range and closing velocity combinations from the ratios of frequency differences and the inter-measurement distances or time spans; and (F) resolving ambiguities by finding the closing velocity vector common to both solution fans and lying exactly within the solution fans' boundaries.

4. The method of claim 3 wherein step (D) further comprises the steps of:

(D1) for each receiver, calculating the frequency difference between said first and second frequency measurements and between said first and third frequency measurements and dividing said first difference by said second difference; and (D2) for each receiver, calculating a difference between said second and third frequency measurements and between said second and fourth frequency measurements and dividing said first difference by said second difference.

5. The method of claim 3 wherein step (E) further includes the following steps:

(E1) for each receiver, expressing the receiver-to-source range divided by a closing speed at one of said measurement points in a frame of reference of one of said two receivers as a function of two bearing angles and an inter-measurement time;

(E2) for each said receiver, expressing said range divided by said closing speed as a function of said two bearing angles, said inter-measurement time, and said first ratio of differences;

(E3) for each said receiver, expressing said range divided by said speed as a function of said two bearing angles, said inter-measurement time, and said second ratio of differences; and (E4) for each said receiver, solving for a unique bearing angle pair common to all three expressions for range divided by speed.

6. The method of claim 3 wherein step (F) includes the following steps:

(F1) expressing a first receiver's range to said source as a multiple of the other receiver's range to the source, said multiple being a known constant;

(F2) determining said first receiver's absolute range to said source by using said known distance between said receivers, said known bearing angles, and the known multiplier in step (A);

(F3) determining the absolute velocity of said source by using said known distance between said receivers, said known absolute range from either receiver to said source, and a known velocity vector of said receiver, and said known bearing angles.

7. A method for determining a position and a velocity of an emitter of an electromagnetic signal moving with a substantially constant but unknown velocity, said signal having a substantially constant but unknown frequency, the method comprising the steps of:

(A) moving a single receiver at a substantially constant velocity along a first substantially straight-line trajectory, said receiver being responsive to all frequencies in a spectral band of frequencies that are Doppler-shifted by the motion of the source in the receiver's reference frame, and said receiver being active at all times;

(B) measuring the Doppler-shifted frequency of said received signal at each of at least four points along the receiver's trajectory and measuring the receiver's inter-measurement distances or time spans;

(C) calculating two ratios of frequency differences, each ratio involving three frequencies and each ratio being a function of a bearing angle between the closing velocity vector and a receiver-to-source line-of-sight in a receiver frame of reference at each of said three measurement points or times in said measurement ratios used for the ratio of frequency differences;

(D) calculating a candidate set of range and closing velocity combinations from said ratios of frequency differences and said inter-measurement distances or time spans;

(E) maneuvering said receiver to a second trajectory which is substantially parallel to said first trajectory and moving said receiver with the same velocity as along said first trajectory and along a second substantially straight-line trajectory;

(F) measuring the Doppler-shifted frequency of the received signal at each of at least four points along the receiver's second trajectory and measuring the receiver's inter-measurement distances or time spans;

(G) calculating two ratios of frequency differences, each ratio involving three frequencies and each ratio being a function of a bearing angle between a closing velocity vector and a receiver-to-source line-of-sight in said receiver frame of reference at each of said three measurement points or times in said measurements used for said ratio of frequency differences;

(H) calculating a candidate set of range and closing velocity combinations from the ratios of frequency differences and the inter-measurement distances or time spans;

(I) creating a phantom set of at least four measurements by iterating forward in time said solution fan derived from the measurement set said receiver collected on said first trajectory, said phantom measurement set having a first frequency measurement made to coincide in absolute time with said first frequency measurement of said second set of at least four frequency measurements; and (J) resolving ambiguities by finding the closing velocity vector common to both solution fans and lying exactly within the solution fans' boundaries.

8. The method of claim 7 wherein step (C) includes the following steps:

(C1) for said receiver moving on said first trajectory, calculating the difference between said first and second frequency measurements and between said first and third frequency measurements and dividing a first such difference by a second such difference and designating the quotient as a first constant; and (C2) for said receiver moving on said first trajectory, calculating a difference between said second and third frequency measurements and between said second and fourth frequency measurements and then dividing said first such difference by said second such difference and designating the quotient as a second constant.

9. The method of claim 7 wherein step (D) includes the following steps:

(D1) for said receiver's first trajectory, expressing the receiver-to-source range divided by a closing speed at one of said measurement points in said receiver's frame of reference as a function of two bearing angles and an inter-measurement time;

(D2) for said receiver's first trajectory, expressing said range divided by speed as a function of said two bearing angles, said inter-measurement time, and said first ratio of differences;

(D3) for said receiver's first trajectory, expressing said range divided by speed as a function of said same two bearing angles, said inter-measurement time, and said second ratio of differences; and (D4) for said receiver's first trajectory, solving for a unique bearing angle pair common to all three expressions for range divided by speed.

10. The method of claim 9 wherein said receiver-to-source range divided by closing speed corresponds to said receiver's second trajectory.

11. The method of claim 7 wherein said second trajectory is parallel to said first trajectory and said second velocity is the same as said first velocity.

12. The method of claim 7 for resolving ambiguities using a real solution fan resulting from said receiver's measurement set along said second trajectory and a phantom solution fan resulting from said receiver's measurement set along said first trajectory and from forward iteration.

13. A system for determining the position of a stationary emitter of an electromagnetic signal having a substantially constant but unknown frequency, such system comprising:

a receiver of electromagnetic signals that is responsive to all signals lying in a spectral band of frequencies that are Doppler-shifted by a motion of said receiver relative to the source, said receiver being active at all times;

means for moving said receiver along a substantially straight-line trajectory;

means for measuring a Doppler-shifted frequency of a received electromagnetic signal at each of at least three points along said trajectory;

means for calculating two ratios of three possible Doppler-shifted frequency pairs, each ratio being a function of a bearing angle between a receiver trajectory and a receiver-to-source line-of-sight at the place or time of the measurement of said first frequency of said ratio and the bearing angle at a place or time of the measurement of the second frequency of said ratio; and means for calculating the position of said emitter relative to said receiver from said frequency ratios and said inter-measurement distances.

14. The system of claim 13 wherein said means for calculating said position includes:
means for calculating a first ratio of measured frequencies, said first ratio being that of said Doppler-shifted frequency at the first measurement position or time and the Doppler-shifted frequency at the second measurement position or time;
means for calculating a second ratio of measured frequencies, said second ratio being that of said Doppler-shifted frequency at said first measurement position or time and said Doppler-shifted frequency at said third measurement position or time;
means for expressing said receiver-to-source range as a function of said first ratio and said ratio of the first measured Doppler-shifted frequency and said unknown emitter frequency;
means for expressing said receiver-to-source range as a function of said second ratio and said ratio of the first measured Doppler-shifted frequency and said unknown emitter frequency;
means for equating said two expressions for range and means for solving for said ratio of said first measured Doppler-shifted frequency and said unknown emitter frequency; and
means for solving for said receiver-to-source range and said bearing angles, using either of said expressions for said range and said ratio of said first measured Doppler-shifted frequency and said unknown emitter frequency, said ratio being known from the means for equating.

15. A system for determining a position and a velocity of an emitter of an electromagnetic signal moving with a substantially constant but unknown velocity and having a substantially constant but unknown frequency, the system comprising:
two receivers, each said receiver responsive to all signals lying in the spectral band of frequencies that are Doppler-shifted by the motion of the source in the receiver's frame of reference and being active at all times;
means for moving said receivers with substantially identical velocities along parallel, substantially straight-line trajectories;
for each of said two receivers, means for measuring a Doppler-shifted frequency of an emitted signal received at each of at least four points along its respective trajectory, and means for measuring inter-measurement distances (or time spans) for each receiver's set of frequency measurements;
for each of said two receivers, means for calculating two ratios of frequency differences, each ratio involving three frequencies, and each ratio being a function of a bearing angle between said closing velocity vector and said receiver-to-source line-of-sight at each of said three measurement points or times in said measurements used for said ratios of frequency differences;
for each of said two receivers, means for calculating a candidate set of range and closing velocity combinations from said ratios of frequency differences and said inter-measurement distances or time spans; and
means for resolving ambiguities by finding a closing velocity vector common to both solution fans and lying exactly within the boundaries of said solution fans.

16. The system of claim 15 wherein said means for calculating the ratio of frequency differences comprises:
for each receiver, means for calculating the difference between said first and second frequency measurements and between said first and third frequency measurements and means for dividing said first such difference by said second such difference; and
for each receiver, means for calculating said difference between said second and third frequency measurements and between said second and fourth frequency measurements and means for dividing a first such difference by the other such difference.

17. The system of claim 15 wherein the means for calculating a candidate set of range and closing velocity combinations comprises:
for each receiver, means for expressing the receiver-to-source range divided by the closing speed at one of said measurement points as a function of two bearing angles and an inter-measurement time;
for each receiver, means for expressing said range divided by speed as a function of said same two bearing angles, said inter-measurement time, and said first ratio of differences;
for each receiver, means for expressing said range divided by speed as a function of said same two bearing angles, said inter-measurement time, and said second ratio of differences; and
for each receiver, means for solving for said unique bearing angle pair common to said three expressions for range, divided by speed.

18. The system of claim 15 wherein said means for resolving solution ambiguities comprises:
means for expressing a first of said two receiver's range to the source as a multiple of the range of the other receiver to the source, said multiplier being a known constant;
means for determining the absolute range of said first receiver to said source by using a known distance between receivers, said known bearing angles, and said known multiplier; and
means for determining the absolute velocity of the source from said known distance between receivers, said known absolute range from either receiver to the source, and said known velocity vector of said receiver, and said known bearing angles.

19. A system for determining, with a single receiver, a position and velocity of an emitter of an electromagnetic signal moving with a substantially constant but unknown velocity and having a substantially constant but unknown frequency, such system comprising:
a single receiver, said receiver responsive to all signals lying in said spectral band of frequencies that are Doppler-shifted by said motion of the source in the receiver's frame of reference and active at all times;
means for moving said receiver at a substantially constant velocity along a substantially straight-line trajectory;
means for measuring said Doppler-shifted frequency of said received signal at each of at least four points along said receiver's trajectory and means for measuring said receiver's inter-measurement distances or time spans;
means for calculating two ratios of frequency differences, each ratio involving three frequencies and each ratio being a function of said bearing angle between said closing velocity vector and said receiver-to-source line-of-sight in said receiver frame of reference at each of said three measurement points or times used for the ratio of frequency differences;

means for calculating a candidate set of range and closing velocity combinations from the ratios of frequency differences and the inter-measurement distances or time spans;

means for maneuvering the receiver to another trajectory which is substantially parallel to said first trajectory and means for moving said receiver with the same velocity as along said first trajectory and along a second substantially straight-line trajectory;

means for measuring the Doppler-shifted frequency of the received signal at each of at least four points along said receiver's second trajectory and means or measuring said receiver's inter-measurement distances or time spans;

means for calculating two ratios of frequency differences, each ratio involving three frequencies and each ratio being a function of a bearing angle between the closing velocity vector and the receiver-to-source line-of-sight in said receiver frame of reference at each of the three measurement points or times;

means for calculating a candidate set of range and closing velocity combinations from said ratios of frequency differences and said inter-measurement distances or time spans;

means for creating a phantom set of at least four measurements by iterating forward in time said solution fan derived from said measurement set said collected on an initial trajectory, said phantom measurement set having its first frequency measurement made to coincide in absolute time with a first frequency measurement of said second set of at least four frequency measurements; and means for resolving ambiguities by finding a closing velocity vector common to both solution fans and lying exactly within said solution fans' boundaries.

20. The system of claim 19 wherein the means for calculating the ratio of frequency differences comprises:
for said single receiver, means for calculating the difference between the first and second frequency measurements and between the first and third frequency measurements and means for dividing the first such difference by the second such difference; and
for said single receiver, means for calculating the difference between the second and third frequency measurements and between the second and fourth frequency measurements and means for dividing the first such difference by the second such difference.

21. The system of claim 19 wherein said means for calculating a candidate set of range and closing velocity combinations from said receiver's first trajectory measurements comprises:
for said single receiver on its first trajectory, means for expressing the receiver-to-source range divided by the magnitude of the closing velocity at one of the measurement points in the receiver's frame of reference as a function of two bearing angles and an inter-measurement time;
for said single receiver on its first trajectory, means for expressing said range divided by speed as a function of said two bearing angles, an inter-measurement time, and said second ratio of differences; and
for said single receiver on its first trajectory, means for solving for a unique bearing angle pair common to all three expressions for range divided by speed.

22. The system of claim 19 wherein said means for calculating a candidate set of range and closing velocity combinations from said receiver's second trajectory measurements comprises:
for said single receiver on its second trajectory, means for expressing the receiver-to-source range divided by the closing speed at one of said measurement points as a function of two bearing angles and an inter-measurement time;
for said single receiver on its second trajectory, means for expressing said range divided by speed as a function of said two bearing angles, said inter-measurement time, and said first ratio of differences;
for said single receiver on its second trajectory, means for expressing said range divided by speed as a function of the same two bearing angles, said inter-measurement time, and said second ratio of differences; and
for said single receiver on its second trajectory, means for solving for a unique bearing angle pair common to all three expressions for range divided by speed.

23. The system of claim 19 wherein the means for resolving solution ambiguities comprises:
means for expressing said receiver's range to the source as a multiple of said receiver's range to the source, said multiplier being a known constant;
means for determining said receiver's absolute range to the source by using the known distance between said receiver's two trajectories, the known bearing angles, and said known multiplier; and
means for determining the absolute velocity of the source by using a known distance between said receiver's two trajectories, said known absolute range from said receiver to the source, and said known velocity vector of said receiver and said known bearing angles.

24. A method for determining the location of a source which emits an electromagnetic signal having a substantially constant but unknown frequency, said method being based on at least three points along a trajectory having a substantially straight-line portion, the method comprising the steps of:

(A) moving a first receiver along said trajectory, said first receiver being responsive to a spectral band including a frequency of said electromagnetic signal that is Doppler-shifted by relative motion between said source and said first receiver;

(B) measuring said Doppler-shifted frequency of said received electromagnetic signal when said receiver is located at each of said three points on said first trajectory;

(C) calculating at least two ratios of frequencies, said ratios being functions of bearing angles; and (D) calculating said location of said source with respect to said first receiver from said frequency ratios at said at-least-three points.

25. The method of claim 24 wherein step (D) includes the steps of:
(D1) expressing said range between said source and said first receiver at a first of said at-least-three predetermined points in a first expression, said first expression being given in terms of a first ratio between the frequency measured at said first predetermined point and said unknown emitted frequency and a second ratio between the frequency measured at said first predetermined point and the frequency measured at a second predetermined point subsequent to said first predetermined point;

(D2) expressing said range between said source and said first receiver at a first of said at-least-three predetermined points in a second expression, said second expression being given in terms of said first ratio and a third ratio between the frequency measured at said first predetermined point and the frequency measured at a third predetermined point subsequent to said first predetermined point;

(D3) equating said first and second expressions and solving said expressions for said first ratio; and (D4) substituting said first ratio into one of said first and second expressions to determine said location.

26. The method of claim 25 wherein said source is stationary.

27. The method of claim 24 wherein said source moves a substantially fixed distance along said source trajectory portion between said predetermined points.

28. The method of claim 24 wherein step (D) comprises the steps of:

(D1) determining a first solution fan of acceptable locations as a function of said unknown frequency and a first pair of said at-least-three Doppler-shifted frequencies;

(D2) determining a second solution fan of acceptable locations as a function of said unknown frequency and a second pair of said at-least-three Doppler-shifted frequencies, said second pair being different from said first pair; and (D3) determining a location for which said first and second solution fans intersect.

29. The method of claim 24 wherein said source is stationary.

30. A method for determining the range between a source which emits an electromagnetic signal and a first receiver of said electromagnetic signal at at-least-four points along a portion of a source trajectory, said source trajectory portion being a substantially straight line and having two end points and said emitted electromagnetic signal having a substantially constant but unknown frequency, the method comprising the steps of:

(A) moving said first receiver along a first receiver trajectory having a substantially straight-line portion, said first receiver being responsive to a spectral band including a frequency of said electromagnetic signal that is Doppler-shifted by relative motion between said source and said first receiver;

(B) measuring said Doppler-shifted frequency at at-least-four predetermined points on said substantially straight-line portion of said first receiver trajectory while said source is on said substantially straight-line trajectory portion;

(C) calculating at least two first ratios of frequencies, said frequencies being functions of bearing angles;

(D) moving a second receiver along a second receiver trajectory having a substantially straight-line portion that is parallel to said first receiver trajectory, said second receiver being responsive to a spectral band including a frequency of said electromagnetic signal that is Doppler-shifted by relative motion between said source and said second receiver;

(E) measuring said Doppler-shifted frequency at said at-least-four predetermined points on said substantially straight-line portion of said second receiver trajectory and said source is on said substantially straight-line portion of said source trajectory;

(F) calculating at least two second ratios of frequencies, said frequencies being functions of bearing angles; and (G) calculating said range between said first receiver and said source from said first and second frequency ratios at said at least four points.

31. The method of claim 30 wherein step (C) includes the steps of:

(C1) calculating the difference between the frequency measured at said first predetermined point and the frequency measured at a first subsequent predetermined point, the other of said first frequency differences being the difference between the frequency measured at said second predetermined point and the frequency measured at a second subsequent predetermined point, and (C2) calculating the difference between the frequency measured at said first predetermined point and the frequency measured at a third subsequent predetermined point, the other of said first frequency differences being the difference between the frequency measured at said first predetermined point and the frequency measured at a fourth subsequent predetermined point, step (F) includes the steps of:

(F1) calculating the difference between the frequency measured at a second predetermined point subsequent to said first predetermined point and the frequency measured at a second subsequent predetermined point, the other of said first frequency differences being the difference between the frequency measured at said second predetermined point and the frequency measured at a third subsequent predetermined point, and (F2) calculating the difference between the frequency measured at said second predetermined point and the frequency measured at a third subsequent predetermined point, the other of said first frequency differences being the difference between the frequency measured at said second predetermined point and the frequency measured at a fourth subsequent predetermined point, and step (G) includes the steps of:

(G1) expressing said range between said source and said first receiver at a first of said at least four predetermined points in a first expression, said first expression being given in terms of said at least two first ratios of frequencies;

(G2) expressing said range between said source and said first receiver at a second of said at least four predetermined points in a second expression, said second expression being given in terms of said at least two second ratios of frequencies;

(G3) equating said first, second and third expressions and solving said expressions for said first ratio; and (G4) substituting said first ratio into one of said first and second expressions to determine said range.

32. The method of claim 30 wherein said source is stationary.

33. The method of claim 30 wherein said source moves a substantially fixed distance along said source trajectory portion between said predetermined points.

34. The method of claim 30 wherein step (G) comprises the steps of:

(G1) determining a first solution surface of acceptable ranges as a function of said unknown frequency and a first pair of said at least three Doppler-shifted frequencies;

(G2) determining a second solution surface of acceptable ranges as a function of said unknown frequency and a second pair of said at-least-three Doppler-shifted frequencies, said second pair being different from said first pair;

(G3) determining a third solution surface of acceptable ranges as a function of said unknown frequency and a second pair of said at-least-three Doppler-shifted frequencies, said second pair being different from said first pair; and (G4) determining a range for which said first, second and third solution surfaces intersect.

35. The method of claim 30, further comprising the step of:

(H) calculating an angular direction between the trajectory of said first receiver and said emitter at said first predetermined point.

36. A method for determining the range between a source which emits an electromagnetic signal and a first receiver of said electromagnetic signal at two pairs of points, each pair including at least four points along a distinct portion of a source trajectory, said source trajectory portions including two substantially parallel, straight lines and said emitted electromagnetic signal having a substantially constant but unknown frequency, the method comprising the steps of:

(A) causing said first receiver to move along a first receiver trajectory, said first receiver being responsive to a spectral band including a frequency of said electromagnetic signal that is Doppler-shifted by relative motion between said source and said first receiver, said first receiver trajectory having a first substantially straight-line portion;

(B) causing said first receiver to measure said Doppler-shifted frequency at a first set of times including at least four predetermined times having predetermined relative intervals therebetween while said first receiver is on said first substantially straight-line portion of said first receiver trajectory and said source is on said substantially straight-line portion of said source trajectory;

(C) calculating at least two first ratios of frequencies, said frequencies being functions of bearing angles; and (D) causing said first receiver to move along a second receiver trajectory, said second receiver trajectory having a second substantially straight-line portion that is parallel to said first substantially straight-line portion;

(E) causing said first receiver to measure said Doppler-shifted frequency at a second set of times including at least four additional predetermined times while said first receiver is on said first substantially straight-line portion of said second receiver trajectory and said source is on said substantially straight-line portion of said source trajectory, said second set of times being subsequent to said four predetermined times and having predetermined relative intervals substantially equal to the corresponding relative intervals of the first set of times;

(F) calculating at least two second ratios of frequencies, said frequencies being functions of bearing angles; and (G) calculating said range between said first receiver and said source from frequency ratios at said at least four points.

37. The method of claim 36 wherein said source is stationary.

38. The method of claim 36 wherein said source moves a substantially fixed distance along said source trajectory portion between said predetermined times.

39. The method of claim 36 wherein said predetermined sets of times have equal corresponding time intervals and step (G) comprises the steps of:

(G1) determining a first solution fan of acceptable ranges as a function of said unknown frequency and a first pair of said at least three Doppler-shifted frequencies;

(G2) determining a second solution fan of acceptable ranges as a function of said unknown frequency and a second pair of said at-least-three Doppler-shifted frequencies, said second pair being different from said first pair;

(G3) iterating one of said first and second solution fans so that said iterated predetermined times correspond; and (G4) determining a range for which said iterated solution fan and said noniterated solution fan intersect.

40. The method of claim 36, further comprising the step of: (H) calculating an angular direction between the trajectory of said first receiver and said emitter at said first predetermined time.

41. A system for determining the range to a source which emits an electromagnetic signal having a substantially constant but unknown frequency from at least three points along a trajectory having a substantially straight-line portion, the system comprising:

a first receiver, said first receiver being responsive to a spectral band including a frequency of said electromagnetic signal that is Doppler-shifted by relative motion between said source and said first receiver;

means for moving a first receiver along said trajectory;

means for measuring said Doppler-shifted frequency of said received electromagnetic signal when said receiver is located at each of said three points on said first trajectory;

means for calculating at least two ratios of frequencies, said frequencies being functions of bearing angles; and means for calculating said range between said first receiver and said source from said frequency ratios at said at-least-three points.

42. The system of claim 41 wherein said means for calculating said range includes:

means for calculating a first ratio between the frequency measured at said first predetermined point and said unknown emitted frequency and a second ratio between the frequency measured at said first predetermined point and the frequency measured at a second predetermined point subsequent to said first predetermined point;

means for calculating the range between said source and said first receiver at a first of said at-least-three predetermined points from said first ratio and a third ratio between the frequency measured at said first predetermined point and the frequency measured at a third predetermined point subsequent to said first predetermined point;

means for solving said first ratio and said range for said first ratio; and means for determining said range by substituting said first ratio into one of said first and second expressions to determine said range.

43. The system of claim 41 wherein said means for calculating said range includes:

means for determining a first solution fan of acceptable ranges as a function of said unknown frequency and a first pair of said at-least-three Doppler-shifted frequencies;

means for determining a second solution fan of acceptable ranges as a function of said unknown frequency and a second pair of said at-least-three Doppler-shifted frequencies, said second pair being different from said first pair; and means for determining a range for which said first and second solution fans intersect.

44. A system for determining the range between a source which emits an electromagnetic signal and a first receiver of said electromagnetic signal at at-least-four points along a portion of a source trajectory, said source trajectory portion being a substantially straight line and having two end points and said emitted electromagnetic signal having a substantially constant but unknown frequency, the system comprising:

a first receiver, said first receiver being responsive to a spectral band including a frequency of said electromagnetic signal that is Doppler-shifted by relative motion between said source and said first receiver;

means for moving said first receiver along a first receiver trajectory having a substantially straight-line portion;

means for measuring said Doppler-shifted frequency at at least four predetermined points on said substantially straight-line portion of said first receiver trajectory while said source is on said substantially straight-line trajectory portion;

means for calculating at least two first ratios of frequencies, said frequencies being functions of said Doppler-shifted frequencies;

a second receiver, said second receiver being responsive to a spectral band including a frequency of said electromagnetic signal that is Doppler-shifted by relative motion between said source and said second receiver;

means for moving said second receiver along a second receiver trajectory having a substantially straight-line portion that is parallel to said first receiver trajectory;

means for measuring said Doppler-shifted frequency at said at-least-four predetermined points on said substantially straight-line portion of said second receiver trajectory and said source is on said substantially straight-line portion of said source trajectory;

means for calculating at least two second ratios of frequencies, said frequencies being functions of said Doppler-shifted frequencies; and means for calculating said range between said first receiver and said source from said first and second frequency ratios at said at-least-four points.

45. The system of claim 44 wherein the means for calculating said at-least-two first ratios of frequencies comprises:

means for calculating the difference between the frequency measured at said first predetermined point and the frequency measured at a first subsequent predetermined point, the other of said first frequency differences being the difference between the frequency measured at said second predetermined point and the frequency measured at a second subsequent predetermined point, and means for calculating the difference between the frequency measured at said first predetermined point and the frequency measured at a third subsequent predetermined point, the other of said first frequency differences being the difference between the frequency measured at said first predetermined point and the frequency measured at a fourth subsequent predetermined point, the means for calculating said at least two second ratios of frequencies comprises:

means for calculating the difference between the frequency measured at a second predetermined point subsequent to said first predetermined point and the frequency measured at a second subsequent predetermined point, the other of said first frequency differences being the difference between the frequency measured at said second predetermined point and the frequency measured at a third subsequent predetermined point, and means for calculating the difference between the frequency measured at said second predetermined point and the frequency measured at a third subsequent predetermined point, the other of said first frequency differences being the difference between the frequency measured at said second predetermined point and the frequency measured at a fourth subsequent predetermined point, and the means for calculating said range between said first receiver and said source comprises:

means for expressing said range between said source and said first receiver at a first of said at-least-four predetermined points in a first expression, said first expression being given in terms of said at least two first ratios of frequencies;

means for expressing said range between said source and said first receiver at a second of said at-least-four predetermined points in a second expression, said second expression being given in terms of said at least two second ratios of frequencies;

means for solving said expressions for said first ratio; and means for determining said range by substituting said first ratio into one of said first and second expressions.

46. A system for determining the range between a source which emits an electromagnetic signal and a first receiver of said electromagnetic signal at two pairs of points, each pair including at least four points along a distinct portion of a source trajectory, said source trajectory portions including two substantially parallel, straight lines and said emitted electromagnetic signal having a substantially constant but unknown frequency, the system comprising:

a first receiver, said first receiver being responsive to a spectral band including a frequency of said electromagnetic signal that is Doppler-shifted by relative motion between said source and said first receiver;

means for moving said first receiver along a first receiver trajectory, said first receiver trajectory having a first substantially straight-line portion;

means for measuring said Doppler-shifted frequency at a first set of times including at least four predetermined times having predetermined relative intervals therebetween while said first receiver is on said first substantially straight-line portion of said first receiver trajectory and said source is on said substantially straight-line portion of said source trajectory;

means for calculating at least two first ratios of frequencies, said frequencies being functions of said Doppler-shifted frequencies;

means for moving said first receiver along a second receiver trajectory, said second receiver trajectory having a second substantially straight-line portion that is parallel to said first substantially straight-line portion;

means for measuring said Doppler-shifted frequency at a second set of times including at least four additional predetermined times while said first receiver is on said first substantially straight-line portion of said second receiver trajectory and said source is on said substantially straight-line portion of said source trajectory, said second set of times being subsequent to said four predetermined times and having predetermined relative intervals substantially equal to the corresponding relative intervals of the first set of times;

means for calculating at least two second ratios of frequencies, said frequencies being functions of bearing angles; and means for calculating said range between said first receiver and said source from said frequency ratios at said at-least-four points.

47. The system of claim 46 wherein said predetermined sets of times have equal corresponding time intervals and said means for calculating said range between said first receiver and said source from said frequency ratios at said at-least-four points comprises:

means for determining a first solution fan of acceptable ranges as a function of said unknown frequency and a first pair of said at-least-three Doppler-shifted frequencies;

means for determining a second solution fan of acceptable ranges as a function of said unknown frequency and a second pair of said at-least-three Doppler-shifted frequencies, said second pair being different from said first pair;

means for iterating one of said first and second solution fans so that said iterated predetermined times correspond; and means for determining a range for which said iterated solution fan and said noniterated solution fan intersect.

* * * * *